(12) United States Patent
Chaturvedi

(10) Patent No.: US 10,572,988 B1
(45) Date of Patent: Feb. 25, 2020

(54) CAPTURING COLOR INFORMATION FROM A PHYSICAL ENVIRONMENT

(71) Applicant: A9.com, Inc., Palo Alto, CA (US)

(72) Inventor: Rupa Chaturvedi, Menlo Park, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/627,225

(22) Filed: Jun. 19, 2017

(51) Int. Cl.
  *G06T 7/00* (2017.01)
  *G06T 19/20* (2011.01)
  *G06Q 30/06* (2012.01)

(52) U.S. Cl.
  CPC ....... *G06T 7/0006* (2013.01); *G06Q 30/0643* (2013.01); *G06T 19/20* (2013.01); *G06T 2207/10024* (2013.01); *G06T 2215/16* (2013.01); *G06T 2219/2012* (2013.01)

(58) Field of Classification Search
  CPC . G06Q 30/0643; G06T 19/20; G06T 2215/16; G06T 19/006
  See application file for complete search history.

(56) References Cited

U.S. PATENT DOCUMENTS

| | | | | |
|---|---|---|---|---|
| 7,295,700 B2 * | 11/2007 | Schiller | ........... | G06K 9/342 382/159 |
| 8,668,798 B2 * | 3/2014 | Cooper | ........... | C03C 8/02 156/107 |
| 9,734,634 B1 * | 8/2017 | Mott | ........... | G06T 19/006 |
| 2002/0006602 A1 * | 1/2002 | Masters | ........... | G09B 25/04 434/72 |
| 2006/0122915 A1 * | 6/2006 | Allen | ........... | G06Q 30/0601 705/26.1 |
| 2011/0018895 A1 * | 1/2011 | Buzyn | ........... | G06T 11/001 345/594 |
| 2017/0262245 A1 * | 9/2017 | Yoganandan | ........... | G06T 7/90 |
| 2018/0075657 A1 * | 3/2018 | Lanier | ........... | G06T 19/006 |

OTHER PUBLICATIONS

"A Basic Introduction to Neural Networks." First seen on Aug. 15, 2007. Accessed via the Web on Oct. 26, 2018. https://web.archive.org/web/20070815133110/http://pages.cs.wisc.edu/~bolo/shipyard/neural/local.html. (Year: 2007).*

* cited by examiner

*Primary Examiner* — Antonio A Caschera
(74) *Attorney, Agent, or Firm* — Hogan Lovells US LLP

(57) ABSTRACT

A computing device is used to capture image data of a physical environment. The image data is analyzed to determine color information for colors represented in the physical environment and to determine scene information that describes a room type associated with the physical environment. A palette of colors is assembled using the colors from the color information and provided for display. Upon selection of a color from the palette of colors, a product associated with the selected color and with the room type is provided for display.

21 Claims, 11 Drawing Sheets

CAPTURING COLOR INFORMATION FROM A PHYSICAL ENVIRONMENT

BACKGROUND

With widespread use of computing devices, such as laptops, tablets, or smartphones, new and interesting approaches have arisen for enabling users to use these computing devices to obtain various types of information. For example, a user seeking to purchase products interacts with their electronic device, via a graphical user interface (GUI) input or other such input. Such interaction includes browsing or searching through electronic catalogs for different types of products available for procurement. The user is typically unable or not equipped to ascertain that a product sought for procurement would match the intended application or surroundings. In an example, the user cannot determine if a product's color matches a physical environment in actual application; that, for instance, a red color lamp would suit in a living room with blue painted walls. Further, the user is unable or not equipped to ascertain if products exist to match the surroundings; that dark blue colored lamps are available and match, as accessories, in a living room painted in a light blue color.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-described deficiencies and other deficiencies in conventional approaches to providing content. In particular, in various embodiments, approaches provide for generating a palette of colors that includes colors that are visually similar, complementary, or contrasting to colors represented in image data (e.g., image stills, video data, a live camera view, etc.) of a physical environment. The palette of colors can be associated with products provided through an electronic marketplace or other such electronic storefront. In response to a selection of a color from the palette of colors, products matching that color and appropriate for the physical space are provided to for display on a computing device. A user may select to purchase the displayed products by selecting on the products, receive additional information, save, among other such interactions with the products.

In various embodiments, image data (e.g., image still and/or video data) of a live camera view is received. The live camera view can include a representation of a physical environment such as a room in a house or other such location. An application executing on the computing device, or remote the computing device, can analyze the image to determine color information and scene information. In various embodiments, the image data can be analyzed using a trained neural network (NN), machine learning approach, or other such approach. In various embodiments, the color information can describe a plurality of colors in the image data and the scene information can describe a room type associated with the physical environment. Colors associated with the color information can be provided in a palette of colors or other such graphical interface (e.g., a color wheel) to a user. In response to a selection of a color of the palette of colors, products associated with the selected color and associated with the room type can be determined and displayed to the user. In one example, the products may be displayed as an overlay over an image of the physical environment on a requesting computing device. Thereafter, a user can purchase a product, save a product to a wish list or other such list, view additional information associated with a product, or otherwise interact with the products as described herein.

Various other functions and advantages are described and suggested below as may be provided in accordance with the various embodiments.

Figure 1A:
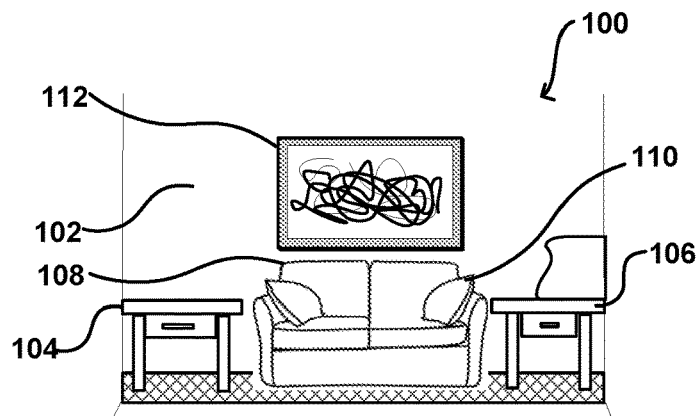
FIGS. 1A-1C illustrate a computing device used to capture a physical environment in accordance with an example of the present disclosure.
Figure 1B:
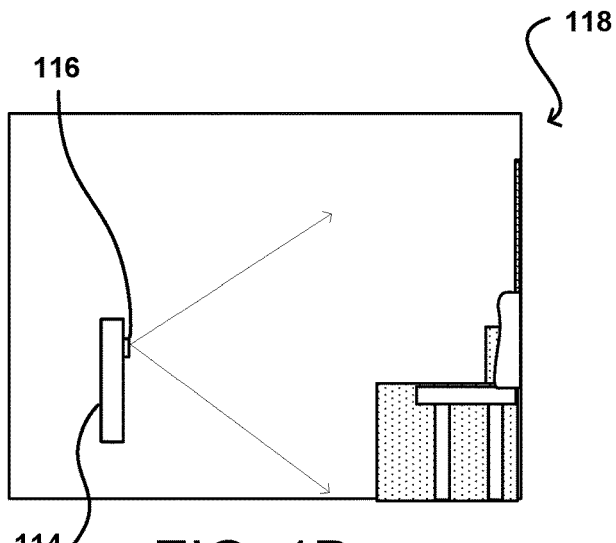
Figure 1C:
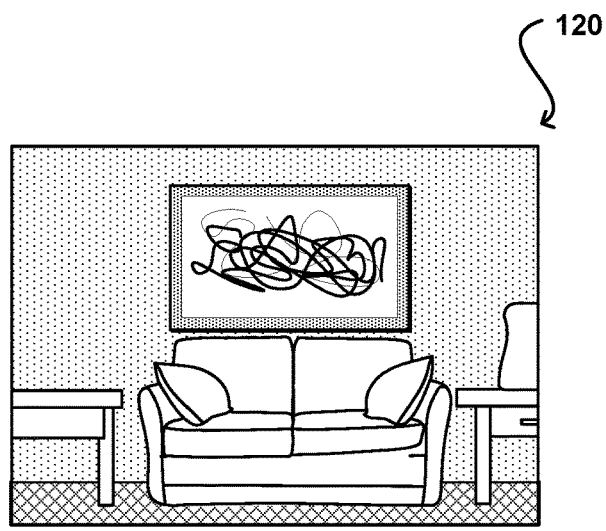

FIGS. 1A-1C illustrate a computing device 114 used to capture a physical environment 100/118 in accordance with an embodiment. In this example, computing device 114 includes a camera, such as camera 116 is illustrated in FIG. 1B. Camera 116 can capture image data (e.g., image, video, or a live camera view) of the physical environment 118. FIG. 1B illustrates a side view of physical environment 100. The physical environment 100/118 is an example of a living room with a blue color painted wall 102 and various objects, including a brown couch 108 with cushions 110, two side tables 104/106, and a painting (on the wall) 112. FIG. 1C illustrates a live camera view, an image, or a video frame, on a display of the computing device 116, showing representations of the objects from physical environment 100. The representations of objects include corresponding color information as recognized by the camera 116. For purposes of this disclosure, the color information for the representations of objects in frame 120 is considered the most accurate representation in comparison to the actual colors of the objects in the physical environment 100. The accuracy is dependent on the ability of the camera 116 to capture the full hue, tint, shade, saturation, brightness, and/or chroma of the actual color from the physical environment 100.

In an example, camera 116 comprises a digital camera incorporating a complimentary metal-oxide-semiconductor (CMOS) image sensor. In another embodiment, the camera 116 of the computing device 114 incorporates other types of image sensors, including a charged couple device (CCD), and/or can incorporate multiple cameras, including at least one wide-angle optical element (e.g., fish eye lens), that enables the camera to capture images over a wide range of angles, such as 180 degrees or more. In embodiments herein, the computing device 114 includes one or more additional cameras on the front, back, top, bottom, or sides of the computing device, and the one or more additional cameras can capture image data facing a front, back, top, bottom, or side surfaces of the computing device. Directions, such as "bottom," "top," back," "side," and "front," are merely examples and not taken to mean specific orientations unless stated otherwise. Further, camera 116 comprises a digital still camera, configured to capture subsequent frames in rapid succession, or a video camera for capture video streams. The computing device 114, in another example, includes other types of imaging elements, such as ambient light sensors, IR sensors, other optical, imaging, lighting, or photon-type sensors.

As mentioned, a user is typically unable or not equipped to ascertain that a product sought for procurement would match the intended application or surroundings. Accordingly, in accordance with various embodiments, the user uses a camera of a computing device to capture an image, video, or live camera view of a physical environment to which the user intends to add a physical product. Image data from the image, the video, or the live camera view is analyzed to determine color and scene information. The color information and scene information can be determined using one or more NNs trained to determine color information and scene information from the image data captured by a camera. A trained NN determines the scene information as a room type by analyzing objects from the image data of the physical environment. When the objects are typically recognized as objects in a living room (e.g., sofa, couch, tables, lamps, etc.), the trained NN determines that the scene information includes these objects, and therefore, represents a living room. A trained NN determines colors from the color information as corresponding to colors of the various objects of the living room—including a light blue color from a painted wall or a brown color from a couch.

The image data may be an input to one or more trained neural networks, which is trained to determine colors for a palette of colors and objects in the physical environment to describe a room type of the physical environment. In accordance with various embodiments, a room type includes without limitation, outdoor scenery (beach, pool, apartment building, etc.), rooms in a house (living room, dining room, bathroom, etc.), context for a scene (restaurant view, a party, etc.) and related aspects that are may be readily understood to one of ordinary skill in possession of this disclosure. Accordingly, room type is a description to a scene or physical environment captured by a camera. When outdoor scenery is involved, the objects are natural features of the outdoor scenery, including trees, rocks, hills, water bodies, etc.

A selection, by the user, of a color from the palette of colors returns products associated with the selected color for display with the image. In this manner, the user is able to determine how products fit within a physical environment by previewing the same in a virtual environment—the returned product may be displayed as an overlay in an intended placement area of the physical product in the physical environment.

Figure 2:
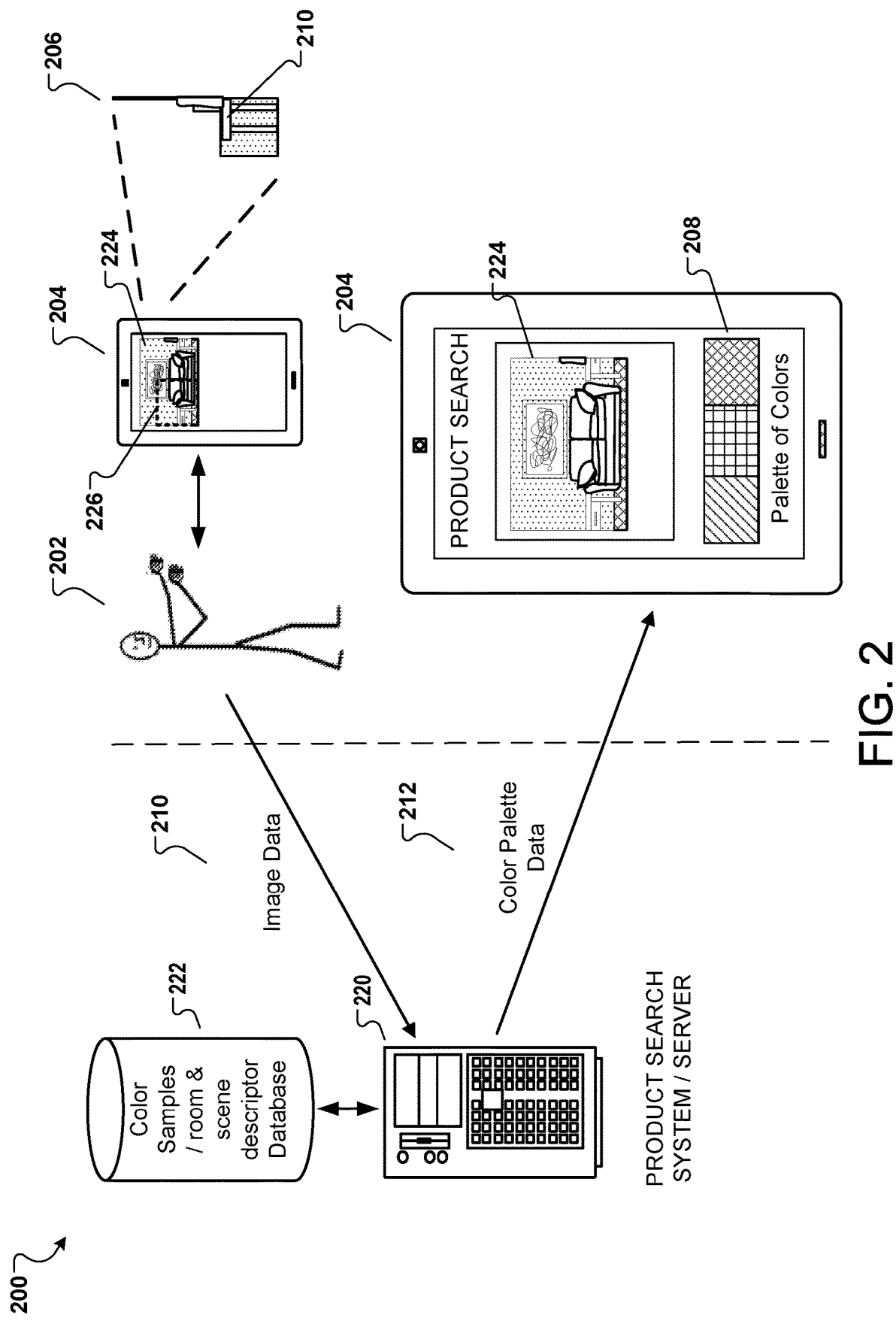
FIG. 2 illustrates an example data flow diagram of a computing device interacting with a product search system or server to obtain a palette of colors in accordance with various embodiments.

FIG. 2 illustrates an example data flow diagram 200 of a computing device 204 interacting with a product search system or server 220 to obtain a palette of colors 208. The palette of colors 208 is displayed on a display screen of the computing device 204, which may be any one of client devices 1002, as described in reference to FIG. 10. In FIG. 2, a user 202 interacts with the computing device 204, through a software application executing on the computing device 204, to capture image data from a media (e.g., an image, a video frame, or a live camera view) 224 of a physical environment 206. Physical environment 206, in an example, is similar to the example living room 100 of FIG. 1A. The image data from media 224 can be captured using a camera in the computing device 204. The image data includes representations of objects corresponding to objects 210 in the physical environment 206. Additionally, in some embodiments, image data can be obtained from different sources rather than being captured by the camera of the computing device 204. For example, image data can be obtained from a different user who shared an image with the user 202. In another example, the image data can be captured using, for example, the computing device 204 while viewing digital media, e.g., a movie, on the computing device 204.

The image data 210 includes color information in the form of the color properties from each pixel of the CCD, the CMOS, or any other applicable sensor in the camera. The color properties are best representations of one or more colors that are in the physical environment 206, to the extent of the abilities of the sensor in the camera. Such best representations may be taken as accurate representations, in an image, of actual colors from a physical environment. In some instances, lighting conditions that exist at the time the image 224 is captured can affect the temperature or intensity of a particular color being captured. For example, a particular shade of blue, as captured in an image, may be perceptually different if imaged on a cloudy day as opposed to being imaged on a sunny day. In aspects of the present disclosure, the user 202 can interact with the software application on the computing device 204 to select a lighting model that is calibrated to the type of lighting conditions existing at the time the image 224 is being captured. For example, the user 202 can select between lighting models that are calibrated for fluorescent light, cloudy weather, sunny weather, natural light, etc. The colors captured in the image 224 can be adjusted, e.g., recalibrated, in accordance to the selected lighting model.

In an example of capturing color from image data of a physical environment 206, image data is first obtained from a captured image. Without an ability to process the image data 210, however, the computing device 204 is unable to ascertain the colors represented in the image data 210. The same holds true for the scene information as well, which may also be determined from the image data 210 by further processing as described below. The image data may include color properties from relevant pixels of the image, the video, or the live camera view 224. The color properties from the relevant pixels correspond to the color information and include values for hue, tint, shade, saturation, brightness, and/or chroma for each pixel. The system of FIG. 2 may include a database 222 of color samples, representing known colors with known color properties. Accordingly, each of the color samples includes a single color value or multiple color values used to describe corresponding color properties. These known color values are applied, in an example of an image processing step of the present system, to train an NN to recognize color information from the image data. The recognized color information corresponds to one or more colors represented in the image data 210 of the physical environment 206. In certain embodiments, multiple trained NNs or other machine learning algorithms are provided as trained to determine specific color information. For example, each trained NN is capable of determining a particular color value from the color information.

In this example, the user 202 interacts with the computing device 204, through a software application executing on the computing device 204 to select a portion 226 of the image for determining color information and scene information as to the portion 226 of the image 224. Thereafter, a palette of colors is provided based on the portion of the image, and related products are provided with the image based on a selection of a color from the palette of colors. Accordingly, this example processes the portion of the image data 210, instead of the whole image data from the image 224. Alternatively, the image data 210 provided to the server 220 may be the selected portion 226 of the image 224, instead of image data corresponding to the whole image 224.

Further, a portion of the image 226 is selected by using a zoom mode associated with the display for the image, after the image 224 is captured, or associated with the camera of the computing device, during capture of the image 224. When the zoom mode is used during capture, more colors may be defined in the color information as the camera pixels are of the computing device 204 are exposed to different light inputs reflecting from the physical environment than without the zoom mode. The image data captured with the zoom mode provide the color information with a degree of separation of the colors from the physical environment than the image data without the zoom mode. The degree of separation may be measured by the distance between differently colored pixels, for instance. Similarly, when the zoom mode is used on the image after the image is captured, more colors may be defined in the color information as the displayed pixels are more granularly separated to reveal slight color variations with more clarity than the image 224 without the zoom mode. As in the case of the zoom mode during capture, the granularly separated pixels is separated by a degree of separation measured by the distance between the pixels. Accordingly, in an example, as the zoom occurs, the palette of colors change to reflect the colors contained in the granular pixels and the zoomed portion of the image.

In some embodiments, International Standards Organization (ISO) settings for measuring sensitivity to light can be used to automatically adjust color settings. For example, a camera may automatically adjust its ISO settings depending on lighting conditions that were determined by a light sensor in the camera. A lower ISO setting can indicate high lighting conditions while a higher ISO setting can indicate low lighting conditions. This observation can be used by, for example, the software application executing on the computing device 204 to adjust the color settings so that the colors in the captured image are visually similar to colors that were actually perceived by the user 202.

Once the image 224 has been captured, the computing device 204 can either use the image as a whole or extract a patch, e.g., a patch of pixels, from the image 224 for capturing color. The pixels of the whole image or the patch provide the basis from which one or more colors in the image 224 is identified. When a patch is used, the patch can be defined as a fixed width and height, e.g., 100 pixels by 100 pixels. In some embodiments, the user 202 can interact with a display screen of the computing device 204 to manually define a portion or region, e.g., a circular or rectangular portion, in the image 224 from which colors will be identified. The region can be defined using, for example, a stylus or a finger—by creating a bounding box around the region of interest.

Extracting a patch from the image 224 can allow for identification of a spectrum of colors that are present in the image 224 or in the patch of image 224. For example, for a patch that includes multiple colors, color palette data 212 can be generated to include respective sets of colors that are visually similar to each of the multiple colors found in the patch. The color palette data 212 is provided for display on the computing device 204 as the palette of colors 208 that may then include a histogram of colors for each of the colors in the patch.

Alternatively, in some embodiments, the user 202 can interact with a display screen of the computing device 204 to identify a single color, e.g., using an eyedropper tool, that identifies a pixel in the image 224. Thus, for example, for an image that includes multiple colors, the user 202 can still select a particular color in the image, and in response, a palette of colors can be generated to include colors that are visually similar to the selected color. In some situations, the user 202 may not be satisfied with the colors in the captured image. Thus, in some embodiments, a color temperature slider, together with the captured colors, is presented on the display screen of the computing device 204. In such embodiments, the user 202 can interact with the color temperature slider to adjust the temperature of the captured colors before a color palette is generated, without having to take a second image of the physical environment.

In some embodiments, the number of colors included in the palette of colors 208 is limited to a specified number of colors. The product search system or server 220 sends color palette data 212 describing the palette of colors 208 to the computing device 204. The palette of colors may, therefore, include the colors from the color information of the captured image. In alternate embodiments, the palette of colors includes complementary or contrasting colors to the colors from the image data or the selected color from the palette of colors.

In an example, the scene information includes relative spatial coordinates for representations of objects that are typical to a room type. The determination of the scene information from an image of a physical environment may provide determination of the room type associated with the physical environment. For example, a living room may typically include a couch, a television, side tables, and other features. A kitchen will typically include an island, a stove, a microwave, utensils, etc. Feature determination or recognition using relative coordinate system or specific features of representations of objects is applicable in training one or more neural networks to perform identification for the room type.

One or more neural networks may be trained to use the scene information of relative spatial coordinates for representations of objects to recognize or determine objects from subsequent images and to use that object recognition to describe the room type as a living room or a kitchen. In an example, the scene information may include grouped values of coordinates or other recognizable feature variations to describe representations of objects. In an example, the system herein utilizes a relative coordinate system from the time of image capture or after image capture to provide relative measurements for predetermined points in the representation of objects of the physical environment. A couch may have a fixed structure defined by a plurality of related coordinate points. A table might have a different set of related coordinate points. The related coordinate points may be relative to a point of image capture or to an arbitrarily chosen point in the image after it has been captured. An example neural network that is trained to recognize each of the related coordinate points for multiple object representations can then distinguish a room type in a physical environment using the objects in the physical environment.

In the previously described example of a living room, the color information may include variations of blue and brown colors—the blue color from the wall and the brown color from the couch. Upon a selection of a color of the palette of colors (e.g., dark blue), an overlay may be provided for products corresponding to the room type in the live camera view. For example, the products may include a dark blue lamp, a brown lamp, and/or a dark blue table for the living room. The overlay in the live camera view provides an augmented reality view of the physical environment. Such an implementation also applies to images and videos that are captured, but that are augmented after they are captured by the camera.

The product search system or server 220 provides color palette data 212, using the color information to the computing device 204, which displays the color palette data 212 as a color palette (or palette of colors) 208. The palette of colors 208 includes one or more colors that are visually similar to colors that are described in the color information. To identify visually similar colors, the product search system or server 220 can compare the color information that was received from the computing device 204 with respective color information from various color samples of a content, product, or training database. In some embodiments, the color samples correspond to colors that have been determined to be popular colors. In some embodiments, the color samples correspond to sponsored colors that have been selected by a curator or an item sponsor for inclusion in the palette of colors.

In an example, the process of generating or providing visually similar colors for the palette of colors 208, as part of an image processing step, is based on providing visual similarity scores for the colors. In such an example method, first color values are associated to a plurality of colors in a database 222. Such values may be arbitrary, but different for each and every variation of color. Second color values are associated to pixels providing image data from a physical environment. The image data can include pixel properties that provide, in an example, color information for the image of the physical environment. The second color values form the color information. The example method then uses a comparison of each of the second color values to each of the first color values to provide the visual similarity scores the second color values. In an example, a standard assignment process is used to assign color values in a manner that is consistent for the type of camera sensor used. In a further example, the above similarly measure process is used with an NN to teach one or more NNs to recognize or determine colors differences and to assign a pixel color as a part or within a family of a known color in a more efficient manner than visual recognition alone. Such NNs may rely on minute variations—that are typically difficult to ascertain with a human eye—in pixel properties to find any difference in hue, tint, shade, saturation, brightness, and/or chroma of a color, and to better classify the color in accordance with known colors from color samples in the database 222.

In another example, the process of generating or providing visually similar colors for the palette of colors 208 is based on color samples with a score that satisfies a threshold value in measure of similarity can be included in a palette of colors that are visually similar to colors in the image. The threshold value is applicable as a basis to training one or more NNs to recognize or ignore fine color differences. For example, when the threshold value for a particular color is low, an implication exists that high similarity must exist for colors to classify as a color represented by that particular color. When the threshold value for the particular color is high, low similarity may exist, and colors with larger differences in their color properties as against the color properties of the particular color are still classified as represented by that particular color. In restricting the threshold value for a particular color, the neural network may be trained to limit colors with only slight variations from the average values for hue, tint, shade, saturation, brightness, and/or chroma of that particular color. Thus, in the prior example involving blue color walls in a living room, the palette of colors 208 provided to computing device 204 may include one or more colors that are visually similar to the particular color of blue recognized from the image 224 of the living room 206. The palette of colors 208 is displayed on the computing device. The user 202 operating the computing device 204 can select a color, i.e., a seed color, from the palette of colors 208 and, in response, the server 202 initiates a color and room type based search for products that have at least one color that is visually similar to the seed color and that have at least a relevance to the room type (e.g., a lamp for a living room or shower curtains for a bathroom).

In yet another example, the process of generating or providing visually similar colors for the palette of colors 208 is based on using a global histogram of color representatives for pixels of the image data. The global histogram represents a distribution of color in an image or a patch of the image. For example, representations of objects in an image include different colors and a histogram of the different colors, over a number of color representatives, forms the color information of the image data. The product search system or server 220 determines a color family histogram for at least a portion of the pixels of the image data. Colors for the color family histogram are determined from the properties of pixels in the image and can be mapped to one or more color representatives and color families associated with the color family histogram. The product search system or server 220 determines color information for the image by normalizing and combining (or concatenating) the global histogram with the color family histogram. The color information can be scaled to have a unit Euclidean norm. A weighting factor can be applied to the color family histogram or the color representative histogram. In some embodiments, the color family histogram is weighted by a factor, e.g., 1.0, 1.1, or 1.2. The normalized and combined (or concatenated) values are then applied as training values to an NN for training the NN to distinguish colors. The weighting factor may be applied as the training weights for the NN.

In yet another aspect, the process of generating or providing visually similar colors for the palette of colors 208 is based on processing color distances from image data of pixels. The image data is compared with known color information from the database 222 using distance measurements. Such distance measurements include dot product, cross product, and Euclidean distance, in a color space, to provide a visual similarity score. Such product or distance information is then applicable to train or teach an NN to recognize similar differences and to classify pixel colors. Color samples from a database 222 that satisfy a threshold visual similarity score, as established using products or distance information, can be selected as a color that is visually similar to a color described by the provided color information for the image. As a result, the selected color samples from the database 222 can be included in the palette of colors 208. Thus, the palette of colors includes one or more colors that are visually similar to a color in the extracted patch of the captured image. Furthermore, when distance measurements form the basis for color classification or distinction then the above referenced NN may be taught to recognize colors differences in accordance with distance limits and may use such teachings to assign a pixel color as a part or within a family of a known color.

In some embodiments, the color samples from which visually similar colors are identified are restricted to popular colors. For example, when identifying colors that are visually similar to colors in the extracted patch, the product search system or sever 220 only evaluates colors that have been determined to be popular. Popular colors may be colors that are associated with certain items, e.g., products that have been identified as being popular for a particular physical environment. For example, a blue color for a living room can be identified as a popular color based on an evaluation of sales data for products, e.g., lamps, curtains, rugs, wall décor, etc., that each have that same blue color in them. In another example, the popular color is the predominant color of the product. In this example, a blue lamp with orange markings is included in the provided results for the color and the physical environment. Evaluating sales data to identify a popular product can include determining whether the product satisfies a threshold sales volume or threshold revenue. Products that are in demand for a physical environment, e.g., trending, can also be identified as being popular.

Popular colors can also be segmented, for example, based on a product category for a physical environment. In an aspect of such an application, based on an evaluation of sales data for products in different product categories, the color orange can be identified as a popular color for products in the rugs category, but not for products in a curtains category. In some embodiments, the color samples from which visually similar colors are identified correspond to curated colors that have been manually selected by an entity, e.g., individual, business, or organization. For example, a curator or item sponsor is a third party provider (see reference 1006 in FIG. 10) that can select one or more colors, as sponsored colors, that are in fashion for a particular time period. The sponsored colors can correspond to a particular brand of products. For example, a particular shade of blue that is being used in the spring curtain collection for a particular brand can be identified. When the particular shade of blue is visually similar to a color that is in the extracted patch of an image, then that particular shade of blue can be included in the palette of colors that is presented to the user 202, thereby priming the user to possibly select a curated product.

In such an implementation for priming the user for products via the present disclosure, a determination is made for a first color value of the color information of an image that satisfies a threshold value and is associated with a first product from products available for the physical environment. Scene information, as described throughout this disclosure, provides relevant information to support mining of the products associated with the physical environment. A determination is made for a second color value of the color information of the image that satisfies the threshold value and that is associated with a second product of the available products for the physical environment. The present system and method may, however provides, as part of the palette of colors and in a predetermined order, a first and a second colors associated with the first and the second color values respectively. Pertinently, the present system and method provides the first and the second colors as part of the palette of colors 208 in a manner to prime the selection of the first color ahead of the second color. For example, the first color is displayed in a higher numerical order or in bigger display area of the palette of colors 208 than the second color. Alternatively, the first color is displayed first, followed by the second color. This example process would cause the user 202 to select the first color with higher probability than the second color, thereby causing a potential sale of the corresponding first product over the second product.

Figure 3:
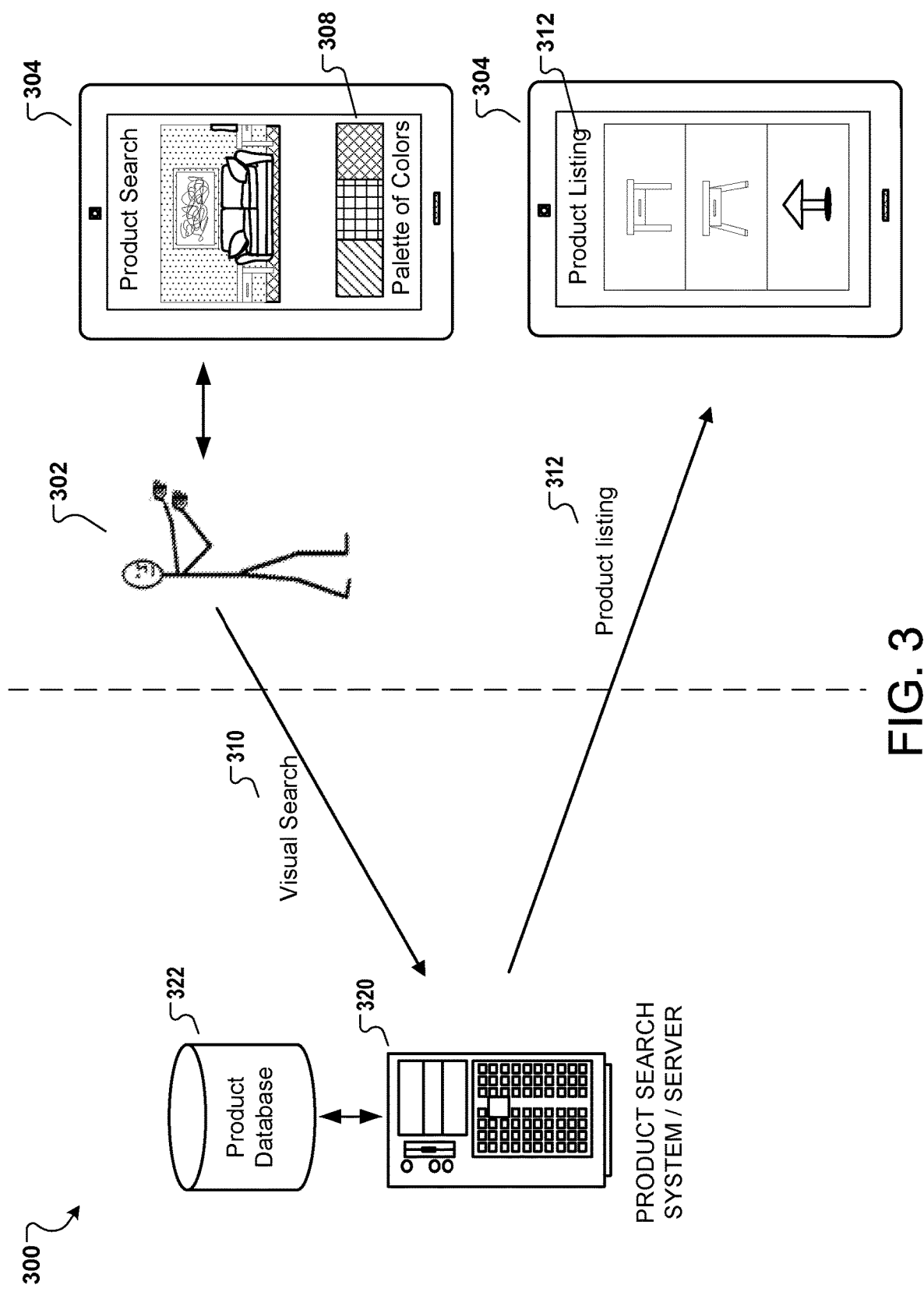
FIG. 3 illustrates an example data flow diagram of a computing device interacting with a product search system or server to obtain products satisfying one or more select colors from the palette of colors one or more scene information from a physical environment in accordance with various embodiments.

FIG. 3 illustrates an example data flow diagram 300 of a computing device 304 interacting with a product search system or server 320 to obtain products from the product database 322 based on satisfying one or more select colors from the palette of colors and one or more scene information from a physical environment (e.g., physical environment 206 of FIG. 2). The data flow of FIG. 3 may follow after the data flow of FIG. 2 is complete or after a part of the data flow of FIG. 2 is complete.

In an example, the image data from an image, a video, or a live camera view of a physical environment, is provided as input to a trained NN that is able to determine scene information from the image data. The scene information, as previously noted in an example, describes objects that are typical to a room type, and therefore, determines a room type associated with the physical environment. Alternatively, the trained NN determines the scene information by recognition of unique spatial coordinates associated with representations of objects in the image data or calculated from the image data. An example of this process is discussed with reference to FIG. 6 in this disclosure. From a trained NN analysis of scene information, the sever 320 is configured to recognize one or more of the representations of objects from the image data as part of a database of known rooms. When the trained NN identifies a couch and a table, for instance, in the scene information of the image data, the trained NN can provide an indication that the physical environment captured in the image data is a living room or a study area. When the trained NN identifies a sink and a tub in an image of a physical environment, for instance, the trained NN may then indicate that the room in the physical environment is a bathroom. In effect the trained NN for the scene information may work in two stages—first, to determine the scene information as to the objects in the physical environment from comparison of features to those in a scene information part of a database 222, and second, to determine that the collective scene information describe a known type of room based on a comparison of features to those in a room type portion of the database 222.

The computing device 304 displays the palette of colors 308 on a display screen of the computing device 304. The user 302 can interact with the computing device 304 to select at least one seed color from the palette of colors 308 as previously described. The seed color can be used to generate a visual search 310 for products that have colors that match the seed color, as described in reference to FIG. 2. The visual search 310 may be defined by a color value sent to the product search system or server 320. Alternatively, the seed color may be sent as an image for visual search 310 to the product search system or server 320. Alternatively, multiple seed colors can be selected by user 302 and, in response, the product search system or sever 320 can identify one or more products from the product database 322 that each include the multiple seed colors and an association to the room type of the image, the video, or live camera view presented on computing device 304.

In some cases, the user 302 may not be satisfied with the colors included in the palette of colors. In such instances, the user 302 can take a second image of the physical environment and a new palette of colors can be generated for the second image. In some embodiments, as previously described with reference to FIG. 2, a color temperature slider is provided with the palette of colors on the display screen of the computing device 304. In such embodiments, the user 302 can interact with the color temperature slider to adjust the temperature of colors in the palette of colors of the second image without having to take a third image of the physical environment.

As described above, the palette of colors 308 can include multiple colors that are visually similar to colors captured by the computing device 304. In some embodiments, when generating the palette of colors 308, the product search system can modify the order in which colors in the palette 108 are presented—e.g., based on popular products associated with the room type of the physical environment and the colors in the palette of colors 308.

For example, in some embodiments, the product search system or server 320 can evaluate the colors that are associated with products preferred by a user, e.g., products previously purchased by the user, history of the user's interest in product, browsing history, preferences, products placed in the user's shopping cart, and products flagged by the user as being of interest to identify colors that are preferred by the user. In such embodiments, if the user captures an image that contains a color that is visually similar to one of the user's preferred colors, for example, then the preferred color can be ordered before other colors that are included in a palette of colors. In some embodiments, the user can manually specify one or more preferred colors. As used in this specification, ordering a first color before a second color involves positioning, in a palette of colors, the first color in a position that comes before, e.g., to the left of, the position of the second color.

In some embodiments, the product search system or server 320 can evaluate products that were identified as being the user's preferred product brands or colors, e.g., products previously purchased by the user, history of the user's interest in product, browsing history, preferences, products placed in the user's shopping cart, and products flagged by the user as being of interest. In such embodiments, if a color is selected to be included in a palette of colors and the selected color is associated with one of the user's preferred brands (or is associated with a previously preferred color for the user), then that color can be ordered before other colors that are also included in the palette of colors 308.

Once seed colors have been selected, the computing device 304 generates the visual search 310 describing the selected seed colors, for example, using the color information, and sends the visual search 310 to the product search system or severs 320. The product search system 320 can search an electronic catalog of products in the product database 322 to identify one or more products that have at least one color that matches the selected seed colors. For example, the visual search 310 can describe the selected seed colors using the color information associated with a color value or an image of the color selected by the user 302. The product search system or server 320 can determine respective visual similarity scores for the color information using a trained NN, for instance, to provide the selected seed colors and color information for each product image in the electronic catalog. In a similar manner, the visual search 310 may include the scene information or the representations of objects in the captured image. The product search system or server 320 uses a corresponding trained NN to identify the room type (based on the scene information or using the image data) and to return relevant product or items associated with the room type. As the present disclosure describes augmentation of live camera view, it is understood to a person of ordinary skill that the visual search process communicates 310 updated scene information and/or color information—as in FIG. 2—to the product search system or server 320 to continuously update the product listing 312 for the computing device 304.

In some instances, the user 302 can specify one or more product categories and, in such situations, the product search system 320 can determine respective visual similarity scores using color information for product images in the electronic catalog that are associated with the specified product categories.

Products referenced by product images that have a respective visual similarity score that satisfies a threshold score can be selected to be included in a product listing. For example, the product listing 312 that is provided to the computing device 304 includes a listing of products 312 that each has at least one color that is visually similar to the selected seed colors and that each has at least one product that is associated with a room type of the captured image pertaining to the visual search 310.

In an example of the above implementation, the user 302 selects a shade of blue, from the palette of colors 308, as a seed color and the product search system/server 320 has already recognized or determined the room type. In response to the seed color, the product search system or server 320 searches the electronic catalog in product database 322 to identify products that match the seed color and are also associated with recognized or determined room type. Products 312 that are identified as matching the seed color and the room type include at least one color for each that matches the seed color as a full color or as a predominant color. However, such products may also include other colors that do not match the seed colors, but are variations of the seed color. Similarly, when multiple seed colors are selected, products identified as matching the seed colors and the room type include at least the seed colors, but may also include other colors as well.

Figure 4A:
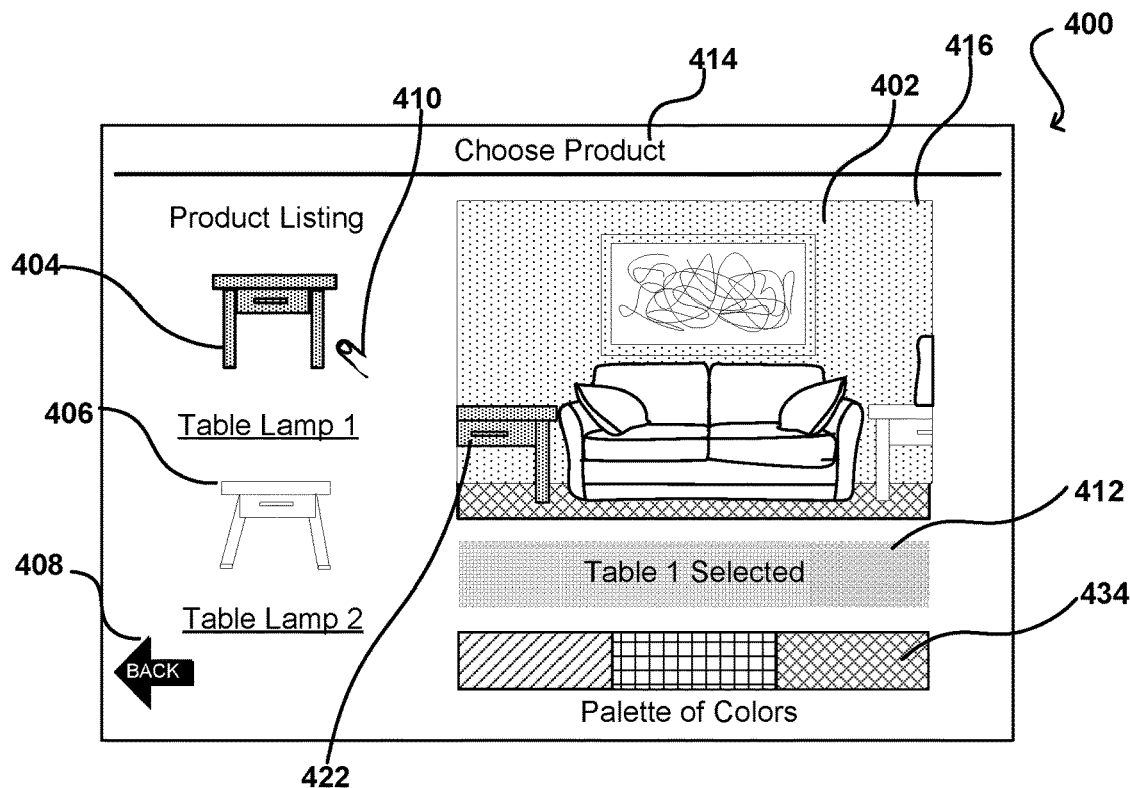
FIGS. 4A-4B illustrate example user interfaces for augmenting an image, video, or live camera view with an obtained product associated with one or more colors in the image, video, or live camera view in accordance with various embodiments.
Figure 4B:
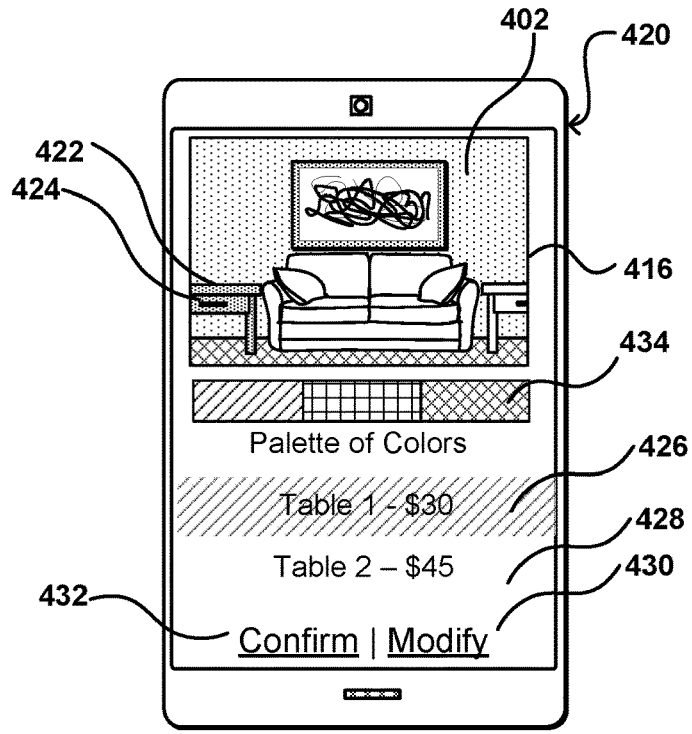

FIGS. 4A-4B illustrate example user interfaces (UIs) for augmenting an image, video, or live camera view with an obtained product associated with one or more colors in the image, video, or live camera view. FIG. 4A illustrates an example UI 400 on a computing device, such as the computing devices in FIGS. 2-3 and described throughout this disclosure. UI 400 may follow the UIs of FIG. 2 (see example UIs on the computing device 204 of FIG. 2). User interfaces are generally used herein to describe the look, feel, and information communicated to a user for user interaction during each phase of a software application to augment images using captured color information from the images. The UI 400 is titled Choose Product 414 to provide the user with an option to augment an image, a video, or a live camera view 416 with a product 404-406 from a product or item listing previously provided, as in the case of FIG. 3. When a user has selected a product 404 from a product or item listing (such as product listing 312 of FIG. 3) for augmentation, the product or item 404 is highlighted and a version of the product 422 may be moved into the image, the video, or the live camera view 416. In an implementation, the version of the product 422 is an overlay (with color) over the image 416. Further, the palette of colors 434 is continually visible through all UIs (e.g., FIGS. 4A-4B) of an application of the present disclosure. The palette of colors 434 is clickable or selectable by the user using any input option as discussed throughout this disclosure, in any of the UIs, in the event that the user seeks to change colors of the product listing 404-406 displayed, or seeks different products associated with other colors from the palette of colors 434.

In an example, once the product listing is provided to a computing device, at least one product, e.g., table 1 404 from the product listing, without user selection, is displayed as an overlay version 422 over the image, the video, or the live camera view 416—as illustrated in FIG. 4A. The table's position or selection may be modified using a finger or stylus 410 or other gesture recognition process to select clickable or selectable area 412. When moveable, a highlight or bounding box appears over the product 422 and it may be moved using the same finger, stylus 410, or gesture, to another area in the image 416, such as from the table 424 to another table in the image. FIG. 4A also demonstrates that the image 416 includes representations of the objects—tables, a couch, and a painting—in their physical color (represented for purposes of simplicity in this disclosure as reference numeral 422 in FIG. 4B). Ambient lighting and related color 402 is also captured in the image 416. Further, table 2 406 listed in the product listing is not highlighted as it is not presently selected to augmenting the image or as a choice by the user.

The UI in FIG. 4B is a subsequent UI from the UI 400, on computing device 420. For example, after the user has decided the location of the product 422, the UI in FIG. 4B provides options to begin the purchase or procurement of the selected product 422. Alternatively, information about the product or advertisement associated with the provided is provided during display of the product or in a subsequent UI. Procurement options for the product, in an example, include costs or availability for renting the product or leasing the product. The user is provided with the pricing available for each of the products in the product listing 426-428. Options are provided to confirm 432 or modify 430 the selection of the table 404-406, where these options are clickable or selectable areas of the UI in FIG. 4B. A selectable back option 408 in FIG. 4A performs a similar clickable or selectable function as the modify option 430 of FIG. 4B. A selection of the back option 408 or modify option 430 sends the user a step back—either from the UI of FIG. 4B to the UI of FIG. 4A or from the UI of FIG. 4A to the UI of FIG. 3.

Figure 5:
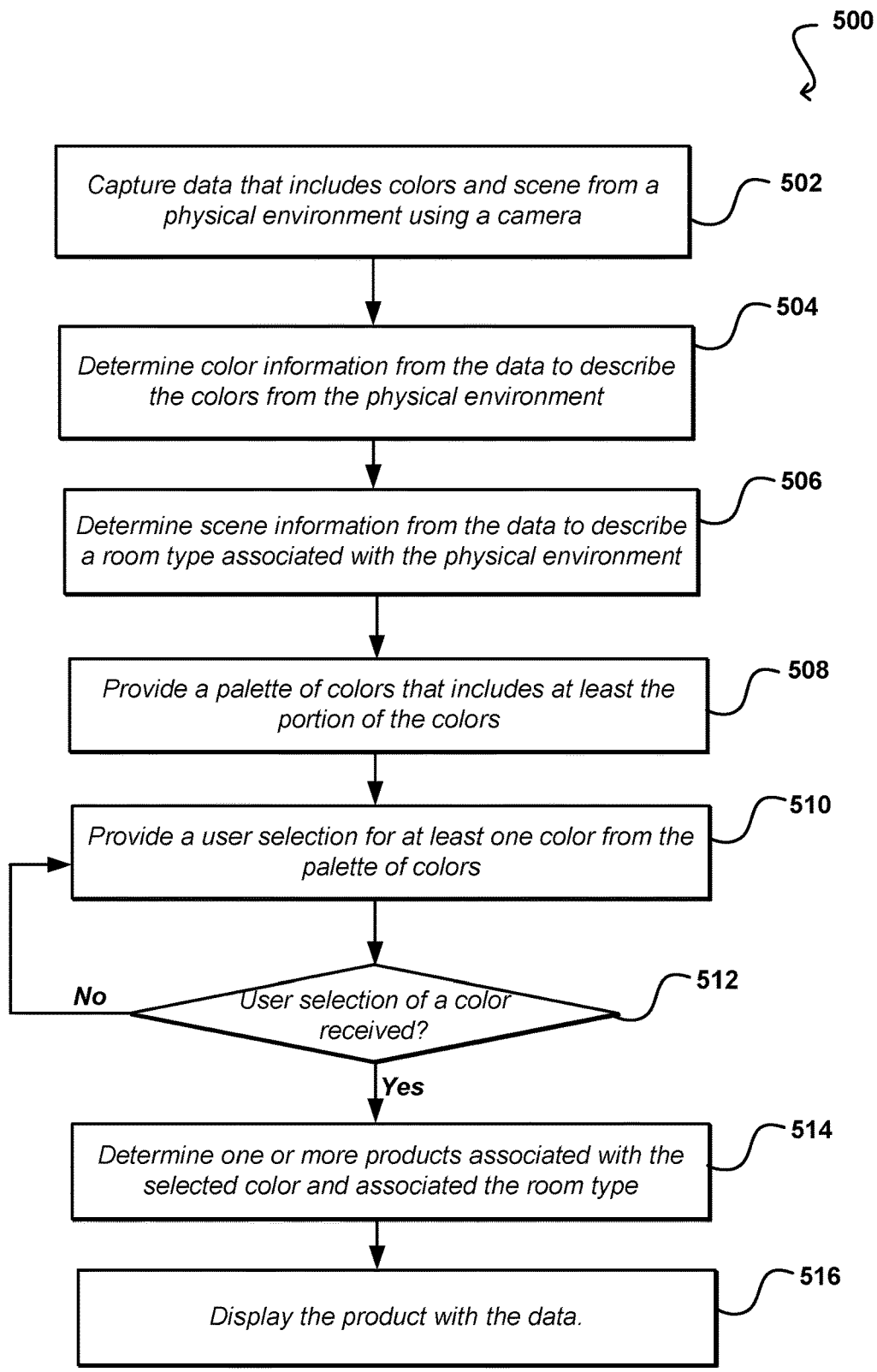
FIG. 5 is a flow diagram of an example process for displaying one or more products associated with one or more colors from a palette of colors and associated with a room type of an image in accordance with various embodiments.

FIG. 5 is a flow diagram of another example process 500 for displaying one or more products associated with one or more colors from a palette of colors and associated with a room type of an image. The example process 500 includes multiple sub-processes 502-514 that work collectively to display a product associated with one or more colors from a palette of colors and associated with a room type represented in the image.

Sub-process 502 captures, using a camera of the computing device, data that includes colors from a physical environment. In sub-process 504, color information is determined from the data. The color information describes the colors in the captured data. Sub-process 506 determines scene information to describe a room type associated with the physical environment. A providing feature of sub-process 508 generates or provides a palette of colors that includes at least a portion of the colors. In an example, the sub-process 508 interrogates a database of products to determine products associated with the color information and the scene information. The palette of colors are then generated or provided to correspond to the determined products from the database of products. When no products exist for the color information, then the palette of colors is, instead, populated by complementary colors, contrasting colors, and/or sponsored colors. The complementary and contrasting colors may be related to the color information, while the sponsor colors may be associated with a popular product or based in part on the user history of products or color preferences. Further sponsored colors may correspond to colors that are provided from a third-party curator wishing to illustrate new color combinations for an interior design project of a room type, for instance. Sub-process 510 provides a user-selection for at least one color from the palette of colors. A determination, via sub-process 512, is made for whether a user selection of a color from the palette of colors was provided. When the determination via sub-process 512 is 'yes' or true input, a further determination occurs, via sub-process 514, for a product in a product database such that the product is associated with the selected color and the room type in the captured data. On determination of a product in sub-process 514, sub-process 516 displays the product with the data. When multiple products exist in the determination of sub-process 514, the products are obtained and displayed with the data, either concurrently or separately. For example, a list of the products is provided with the data forming the image or one product is overlaid on the image, while the remaining products are ordered in a list adjacent the image.

In an alternate implementation, the example process 500 relies on sub-process 502 for receiving data, such as image data, of a live camera view from the camera. Here, instead of capturing data, sub-process 502 can rely on image data provided from other devices, as previously discussed. As in the case of the prior embodiment, the data includes a representation of a physical environment. Sub-process 504 may include additional steps to analyze the data using a first trained NN to determine the color information describing a plurality of colors represented in the physical environment. Sub-process 506 may include additional steps to analyze the data using a second trained NN to determine scene information describing a room type associated with the physical environment. The generation or providing step in sub-process 508 generates a palette of colors that includes at least a portion of the colors. In sub-process 512, a selection of a color from the palette of colors is received. When it is determined, via sub-process 512, that at least a product exists for the selected color and the room type, the product may be provided as an overlay in the live camera view via sub-process 514. The overlay provides an augmented reality view of the physical environment.

Figure 6:
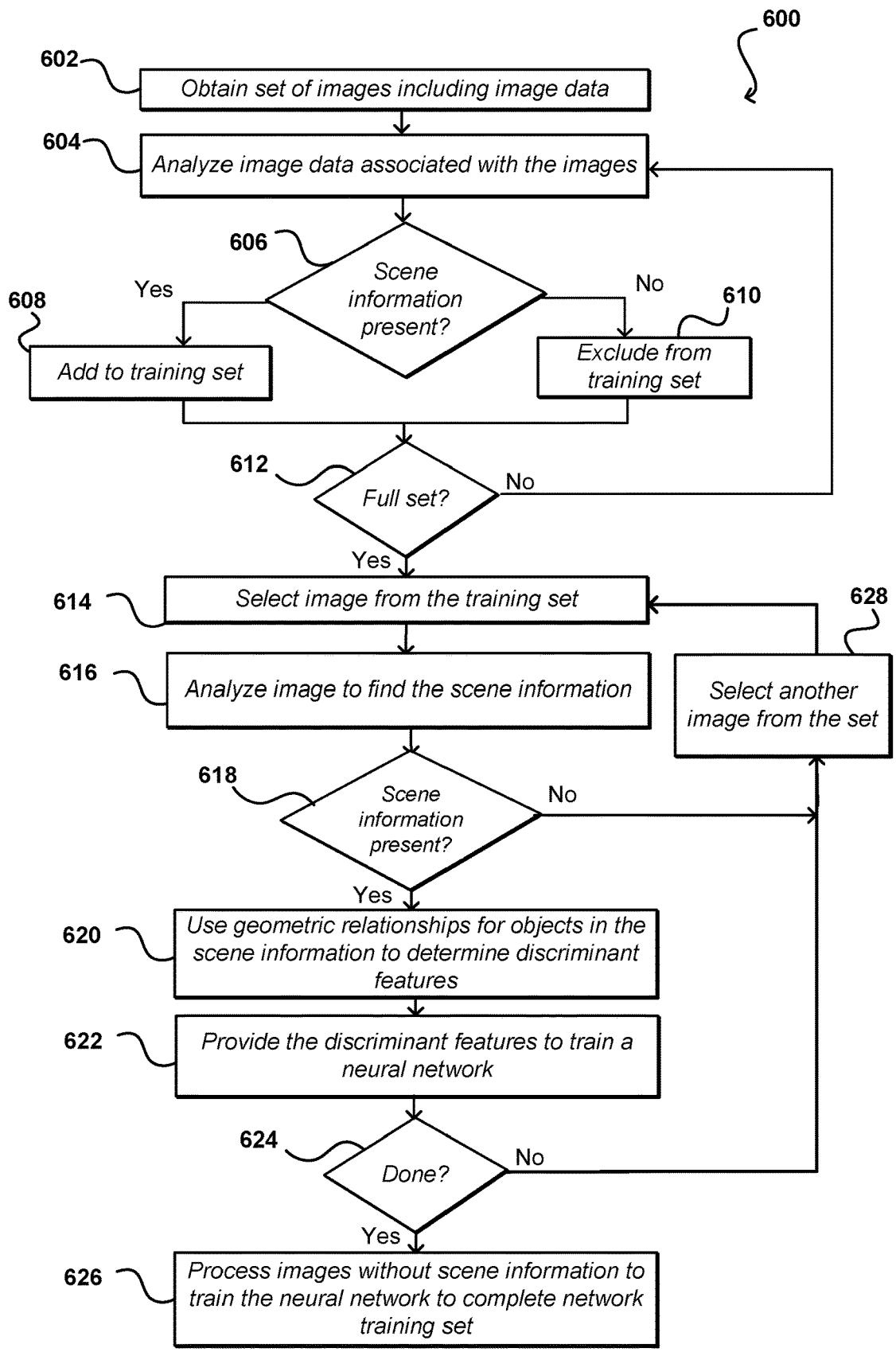
FIG. 6 illustrates an example training neural network process for training a neural network to recognize physical environments in accordance with various embodiments.

FIG. 6 illustrates an example NN training process 600 for training an NN or other machine learning-based approach to recognize physical environments using scene information from spatial information associated with images. The NN training process 600 includes multiple sub-processes 602-626 that work collectively to train the NN. Sub-process 602 obtains a set of images including image data. The set of images may be from an image database that stores images to improve the NN. As previously described, the term images used herein refers to images, videos (including video frames), and live camera views on a display of a computing device. Accordingly, this NN training process 600 is applicable to recognize physical environments in each of the images, the videos (including the video frames), and the live camera views.

Sub-process 604 analyzes the image data associated with the images. Such analysis could provide a determination, via sub-process 604, that certain images are likely to include scene information. In an example, scene information includes recognizable coordinates or features for representations of objects in the images. In sub-process 604, for instance, each image may be analyzed for metadata, color variations (using histograms), object markers, etc. When there is a likelihood of scene information as detected by sub-process 606, the corresponding image is added to a training set, as in sub-process 608. Images considered to not include scene information may be excluded from the training set, as in sub-process 610. In an example, images that do not include scene information may be those images that do not include coherent coordinate points. Image filtering may be applicable to determine if boundary variations exist in a manner that indicates multiple objects or different features (scene information) exist in an image. Alternatively, color variations are a basis to filter images as including scene information than images with no significant color variations. Sub-process 612 determines when a full set of images are present in both, the training set and the set excluded from training images.

Sub-process 614 selects an image from the training set for training one or more NNs. Sub-process 616 analyzes the image to find the scene information using similar processes as in sub-process 604, for instance. When it is determined that scene information are present, via sub-process 618, then further processing as in sub-processes 620-622 commences. For example, metadata or other identifiers may be used to train an NN to classify images using their scene information. Alternatively, coordinates or features are applicable to train NNs. In sub-process 620, geometric relationships in coordinates for each scene information is used to determine discriminant features for the scene information. Such training enables a trained NN to determine room types based on the discriminant content of the image data. As previously described, particular features exist in a living room that are seen as discriminant other spaces, such as a kitchen or a bathroom. These features are typically objects—such as a bed, a couch, a stove, etc. With this information trained into a NN, the trained NN is able to discern from the image data the type of objects in an image, and therefore, is capable of determining the room type for the image.

NNs (NNs) typically use a gradient descent with a large amount of training data, but other training algorithms are applicable, including stochastic approaches and Levenberg-Marquardt training. In an aspect of the present disclosure, convolutional NNs are used in the training to determine room type using scene information. An NN may be trained to distinguish multiple data classifications or clusters (each corresponding to a different object representing scene information) or may be trained to distinguish a single data classification or cluster (corresponding to one object representing a scene information). When a single data classification is trained to an NN, multiple such single data classification NNs may be required, with each being capable of determining specific scene information—e.g., specific objects or geometric features. Convolutional NNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. NNs exploit spatially-local correlation by enforcing a local connectivity pattern between nodes of adjacent layers of the network.

In some embodiments, individual nodes and/or layers of the NN may be implemented by one or more functions stored as computer executable instructions stored in a memory. For example, input layer nodes may include memory for storing input values. Each input layer node may be associated with a function stored as computer executable instructions in memory. The function may be applied to the input value and a resulting output value may be passed to one or more hidden layer nodes connected to the input layer nodes. Similarly, each hidden layer node may be associated with a function having N inputs (received from N connected input layer nodes). These functions may also be stored as computer executable instructions and/or data for computing values to be sent to one or more output layer nodes. The output layer nodes may be connected to the hidden layer nodes and may include memory for storing output values indicative of one or more attributes, entities, or concepts that the trained NN can identify, such as product attributes shown on web pages or catalogs.

In various embodiments, the nodes may form a directed graph or other data structure, with each layer of nodes occupying a different portion of the graph. Different layers of the network can be composed for different purposes, such as convolution and sub-sampling. In one example there is an input layer which along with a set of adjacent layers forms the convolution portion of the example network. The bottom layer of the convolution layer, along with the lower layer and output layer, make up the fully connected portion of the NN. From the input layer, a number of output values can be determined from the output layer, which can include several products determined to be related to an input option. The NN is trained on a training data set, which may include the geometric relationships or features for scene information that define a room type. The training provides the NN with learning ability for the best feature representation for the discriminatory data to distinguish room types based on scene information.

Sub-process 622 provides the discriminant features to train a NN. In an example, coordinates of features associated with representations of an object from one or more training images of the set are provided as the discriminant features in a first order input to the NN. The NN may be a multi-layered NN model with multiple hidden layers indicating deep learning. An initial layer takes first level features of one or more objects. The multiple hidden layers take the hidden state of an element as input, enriching it by multiplying it with the hidden states of other elements, e.g., other coordinates relating to other objects than the input objects. The number of hidden layers is chosen based partly on the number of input variables, the weights assigned to each node in the hidden layers, any included bias values for each node, and the number of epochs of training to secure the least error in the trained NN. An output from the training NN is back propagated into the network to determine if the input values are similar to the back propagated output. An error in the value difference is used to vary the weights and the biases during a forward propagation of the same training NN. Once the error is found to be the least possible in multiple epochs of the training, then the training is stopped, via sub-process 624, and the training NN is considered a trained NN. When multiple images are available, the sub-processes 614-624 are repeated, via sub-process 628, to provide sufficient discriminant features to train the NN. Once sufficient discriminant features are available, the above training proceeds to reduce the NN error to the least and to attain a trained NN.

The data values associated with the trained NN are considered trained data values, which are then applied to new images (e.g., image data of test images or live camera view) to determine if any of the features of the new images classify within the trained data values. When minimum error is returned for new image data, then one or more classifications are considered to have occurred for the new images, which in turn indicate that features of representations of objects in the new images are recognizable as similar to ones in the trained data values. In a further example, the trained NN may be further processed using image data from images without scene information, as in sub-process 626, to improve the trained NN. Once a new image is determined as including certain types of scene information, the collective information from the scene information describe the room type—e.g., as previously explained, a trained NN determines scene information, such as couches and tables, from the new image, which in turn describes that a room type in the new image is a living room.

In another implementation, one or more portions of image data corresponding to images from the training set of images may be applied to train one or more NNs. In such an implementation, position information is obtained using one or more bounding boxes in the images for respective selected portions. The bounding boxes represent areas of interest in the images for training NNs. The bounding boxes may be pre-determined or identified upon request of a user (e.g., administrator) of the system. In an example, the bounding boxes are implemented to retrain aspects of a trained NN. Once the position information is obtained, a new NN may be trained or an existing NN may be retrained using similar processing as described with respect to FIG. 6. Pertinently, as input to train NNs in FIG. 6, only selected portions of images are analyzed in the filtering and classification processes to build the NNs to discriminate scene information for room types and color information for color in the portions of the images. Once completed, the new or retrained NNs are tested using portions of other images or the same image that was used to train (or retrain) the NN. The trained (or retrained) NNs for the portions of the image data are provided for similarity analysis for color and room type.

NNs are example machine learning process for the present embodiments. However, other machine learning processes such as support vector machines (SVM), Gaussian processes, random forests, and classification and regression trees are applicable to train NNs, from prior image data, to determine color and scene information, and to provide color palettes and room type for a new image.

Figure 7:
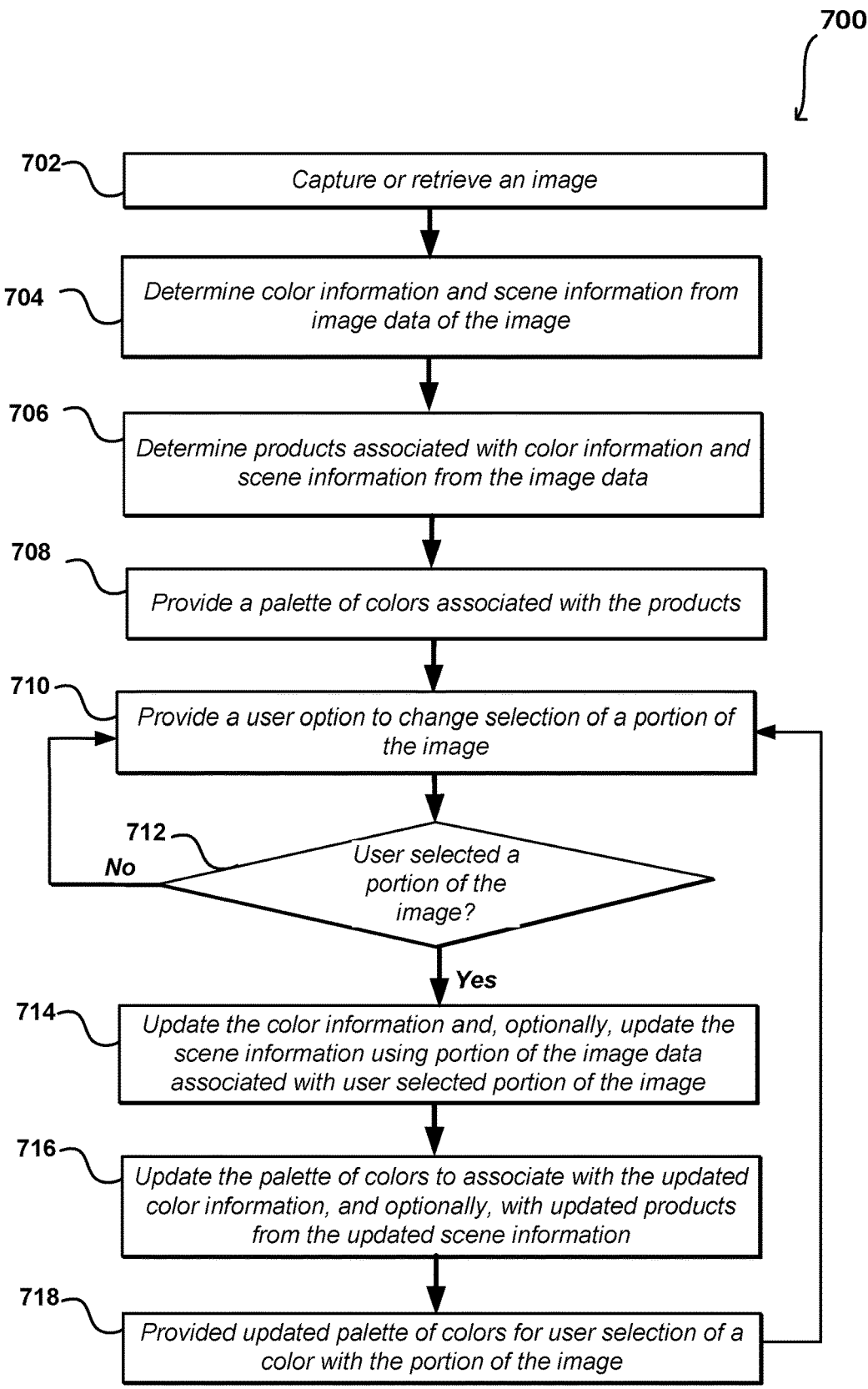
FIG. 7 illustrates an example process for selecting a portion of an image for color and room type analysis to retrieve corresponding products.

FIG. 7 illustrates an example process 700 for requesting products for a selected portion of a captured or existing image, such as the portion 226 of image 224 of FIG. 2. Sub-process 702 captures or retrieves an image that is provided for display on a computing device of a user. Sub-process 704 is a determination for color information and scene information associated with image data from the captured or existing image in sub-process 702. Sub-process 704 may be performed on a server in communication with the computing device. A further determination, via sub-process 706, occurs to find products associated with the color and the scene information from the image data of sub-process 704. A palette of colors that is associated with the products is provided on the display for the user. As previously noted, the palette of colors is associated with the scene information and the color information of the captured or the existing image. When no products exist for the color information or the scene information, complementary, contrasting, or sponsored colors are provided in the palette of colors, instead. Sub-process 710 demonstrates that a user option is provided to change selection of a portion of the image via an input on the computing device. In an example, via sub-process 712, a user may use a finger, stylus, air gestures, motion gestures, touchscreen, a push button, touch pad, wheel, joystick, keyboard, mouse, keypad, voice commands (using a smart assistant), visual commands, or any other input to select a portion of the image from sub-process 702. In a further example, the user option is a zoom in a live camera view of the image in sub-process 702. Upon zooming, the computing device recognizes that a selection of portion of the image has occurred.

In sub-process 714, updated image data is newly obtained or a portion of the image data from the captured or retrieved image data is relied upon to update the color information, and optionally, the scene information. For simplicity, the newly obtained image data or the portion of the image data from the captured or retrieved image data is referred to as the updated image data. A person of ordinary skill reading this disclosure would understand that, in certain instances, the updated image data is already existent as part of the captured or the retrieved image data, but is considered updated image data because it focusses the neural networks used to determine the updated color information and the updated scene information. The updated image data, therefore, causes the server to update the color information and the scene information via the sub-process 714. For example, position information as to the updated scene information for the selected portion is obtained from the computing device and provided to the server.

In an alternative implementation, the position information as to the captured or retrieved image data is focused to the selected portion to retest a neural network to determine the update color information and the updated scene information. In an embodiment, the position information corresponds to coordinates of the image that is fully presented to the server. Alternatively, only the selected portion of the image is presented to the server—representing the newly obtained image data. In yet another alternative, part of the image data is analyzed, by retesting neural networks, for the updated color and the updated scene information, if the computing device of the user has the capability to process image data in the manner described in the present embodiments. At sub-process 716, the palette of colors previously provided via sub-process 708 is updated to associate with the update color information, and optionally, the updated scene information. Upon reading this disclosure, a person or ordinary skill would recognize that a database of products may be first interrogated to determine additional or new colors associated with the updated color information, and optionally, with the updated scene information. When products exist for the updated color and the optionally updated scene information, colors associated with these products are provided to update the palette of colors. At sub-process 718, the updated palette of colors is provided for user selection of a color associated with the portion of the image. The selection of a color at this sub-process 718 or the previously presented palette of colors in sub-process 708 would proceed as in sub-processes 512 to 516 of FIG. 5. A change, however, to the portion of the image of sub-process 718 via the user option in sub-process 710 would result in repeating sub-processes 712 to 718 to provide another updated palette of colors for the change to the portion of the image of sub-process 718.

Figure 8:
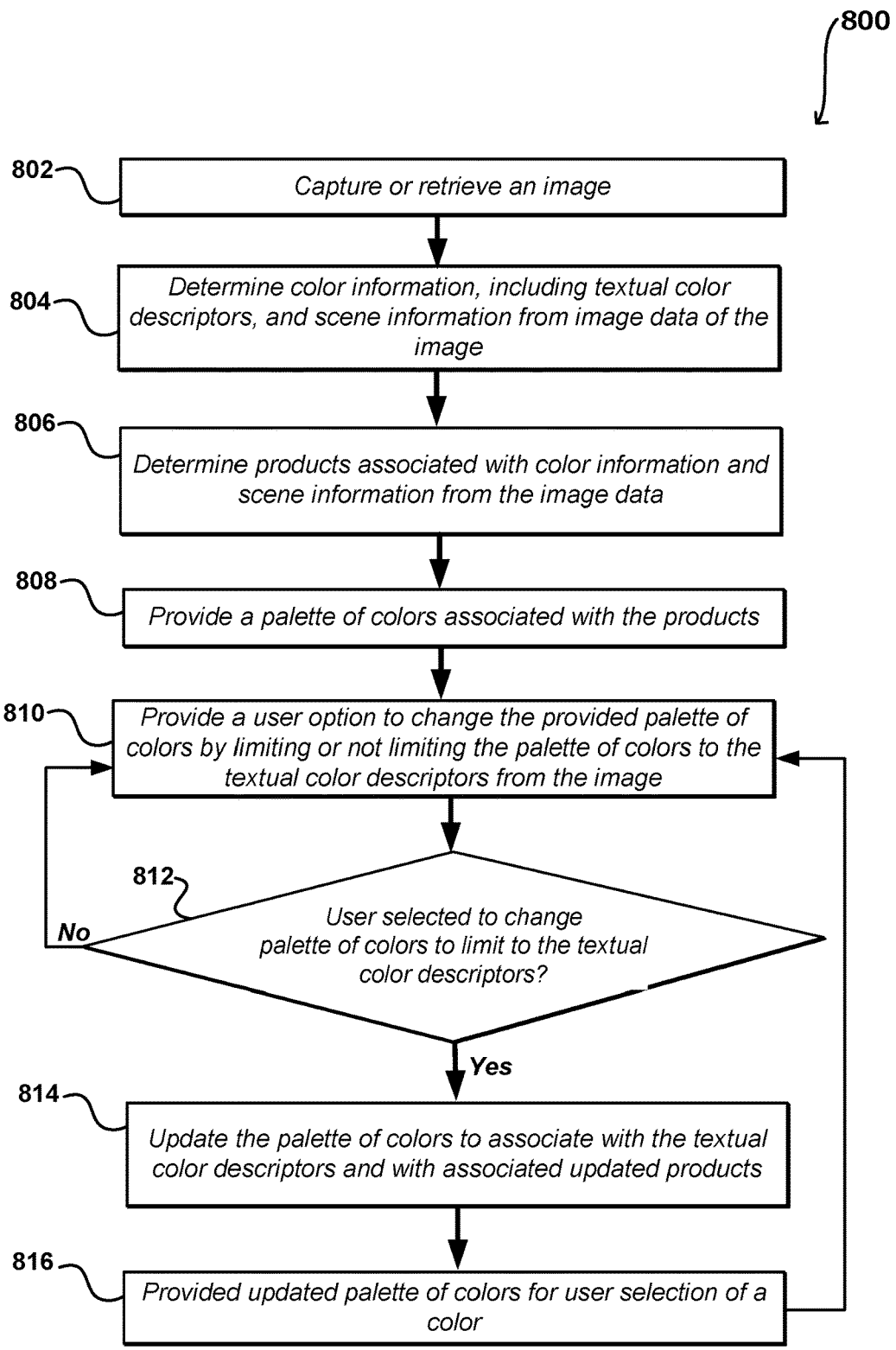
FIG. 8 illustrates an example process for limiting a palette of colors to textual descriptors obtained from an captured or retrieved image.

FIG. 8 illustrates an example process 800 for limiting a palette of colors using a textual color descriptor that may be present in a captured or retrieved image of a physical environment. For example, the textual color descriptor may include a text description of a color associated with an object in the physical environment. The text description may be an alphanumeric code that is defined as a color standard provided by one or more standard bodies. In such an example, standard bodies may include the American National Standards Institute/American Society of Mechanical Engineers (ANSI/ASME), the Occupation Safety and Health Administration (OSHA), the Abnormal Situation Management (ASM®), the Federal Standard 595C, or the ISCC-NBS System of Color Designation by the Inter-Society Color Council that includes the National Bureau of Standards. When the captured or retrieved image includes a representation of an object that is physically tagged with a label or tag, and when such label or tag includes a textual color descriptor in an alphanumeric code, for example, this textual color descriptor is recognizable to the process 800.

Accordingly, in sub-process 804, a determination for color information for the captured or retrieved image includes information for textual color descriptors as recognized from the captured or retrieved image. Such a determination takes into consideration the text labels or tags attached to physical products and visually captured in the representations of objects. The color information is, therefore, improved by a combination of a neural network color determination and the textual color descriptors. In sub-process 806, products may be determined as associated with the color information and the scene information from sub-process 804. A palette of colors is provided, via sub-process 808, based on the determination in sub-process 806.

As previously noted, the palette of colors is associated with the scene information and the color information of the captured or the existing image. When no products exist for the color information or the scene information, complementary, contrasting, or sponsored colors are provided in the palette of colors, instead. Sub-process 810 demonstrates that a user option is provided to change the palette of colors, from sub-process 808, by limiting the palette of colors to textual color descriptors from the captured or retrieved image of sub-process 802. In such implementations, when sub-process 812 detects the user selection to change the palette of colors, an update, via sub-process 814, is provided to the palette of colors. The update to the palette of colors associates those colors to the palette of colors that are defined as corresponding to the textual color descriptors. The update to the palette of colors, in sub-process 814, may also include associated updated products. When no products exist as associated with the textual color descriptors, the user may be urged to broaden the selection to the palette of colors to beyond the textual color descriptors.

At sub-process 814, the palette of colors that was previously provided via sub-process 808 is updated to associate with the textual color descriptors. Upon reading this disclosure, a person or ordinary skill would recognize that a database of products may be first interrogated to determine additional or new standard-defined colors associated with the textual color descriptors. When products exist for the textual color descriptors, colors associated with these products are provided to update the palette of colors. At sub-process 816, the updated palette of colors is provided for user selection of a color. The selection of a color at this sub-process 816 or the previously presented palette of colors in sub-process 808 would proceed as in sub-processes 512 to 516 of FIG. 5.

Figure 9:
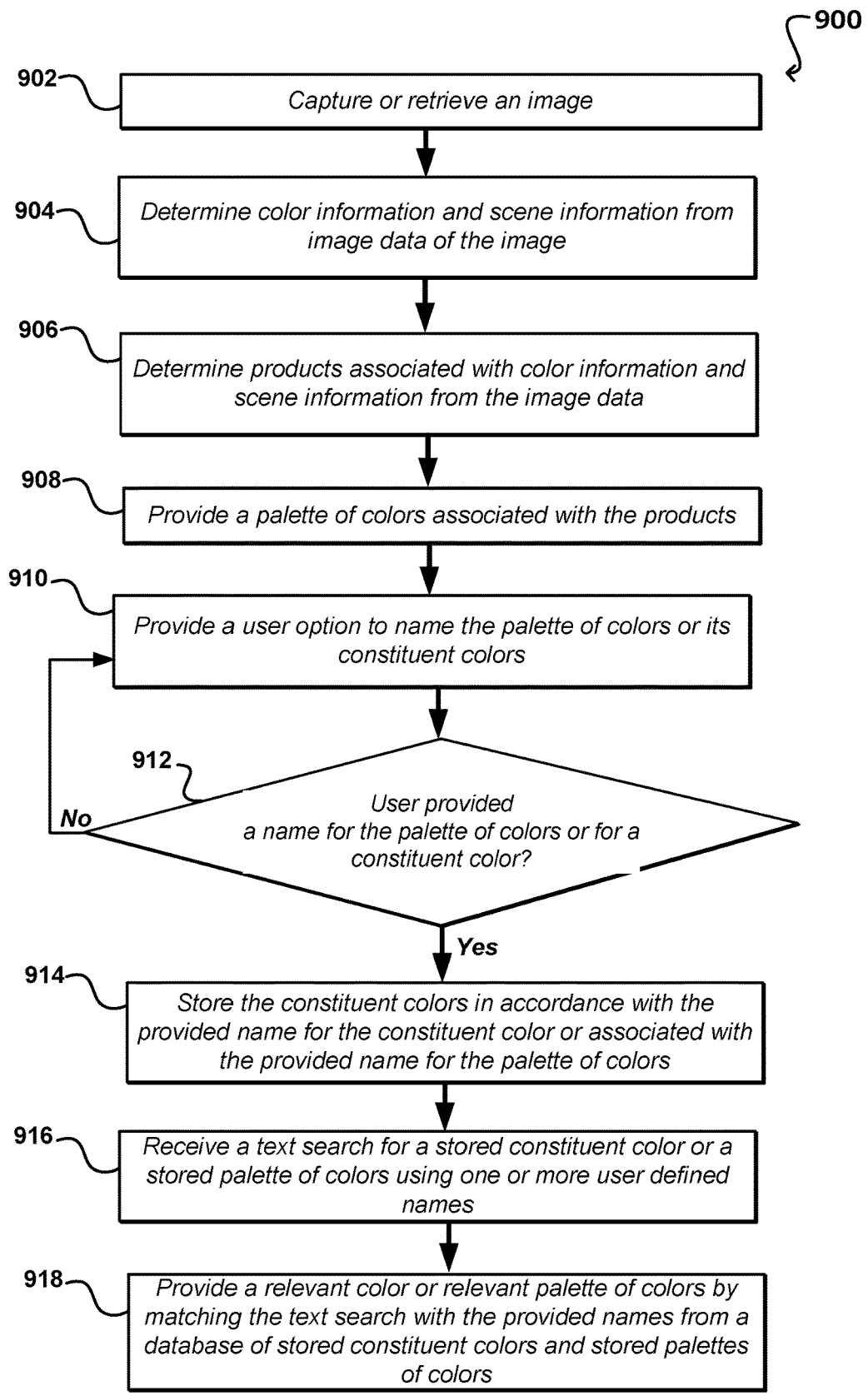
FIG. 9 illustrates an example process for storing constituent colors or a palette of colors by a user defined names for subsequent text searching.

FIG. 9 illustrates an example process 900 for storing constituent colors or a palette of colors by user defined names for subsequent text searching. A captured or retrieved image is obtained via sub-process 902. In sub-process 904, a determination for color information and for scene information is performed from the image data of the image. In sub-process 906, products may be determined as associated with the color information and the scene information from sub-process 904. A palette of colors is provided, via sub-process 908, based on the determination in sub-process 906.

Sub-process 910 demonstrates that a user option is provided to name the palette of colors or its constituent colors in the palette of colors. The name for the constituent colors is a user-defined name, for example, pinkish blue, metallic grey, children's toys, etc. Similarly the name for the palette of colors is a user-defined name, for example, garden colors, modernistic colors, etc. In such implementations, when sub-process 912 determines the user provided name(s) for the constituent color or the palette of colors, then the process 900 can proceed to sub-process 914. In sub-process 914, the constituent colors in the palette of colors and the palette of colors are stored using provided names for each constituent color and the provided name for the palette of colors. In a subsequent or separate process to the storage of constituent colors or the palette of colors, when a text search is provided for stored constituent colors or stored palettes of colors, a match for the text search and the user-defined names is conducted. When user-defined names match the text search by name, phrases, alphabets, or context, the relevant color or palette of colors corresponding to the match is provided in response to the text search. This is illustrated via sub-processes 916-918. In an example, the user-defined names are stored privately or publicly in response to a user's preference for the user providing the user-defined names.

In another implementation, the stored names may be applicable to categorizing stored palette of colors. For example, when a user provides an image of a car interior and when a palette of colors is generated or provided for the car interior, the user may store the palette of colors and each constituent color by appropriate names. In subsequent use of the present system and process, when the same user or an unrelated user intends to request for a palette of colors, the user may first peruse previously stored palette of colors before taking an image of the unrelated user's car interior. Alternatively, in response to the unrelated user's image of a car interior, the present system and process promotes a stored palette of colors corresponding to a stored car interior to the unrelated user after recognizing the room type as a car interior. In another aspect using a similar process, certain colors may be determined as most preferred to children of certain disorders, including autism. In such cases, when a previous user has stored certain colors under a name relating to child preferences, such colors may be promoted to a user searching for the same—using a room type determination of a child's room, a hospital room, or a text search for children's colors. In an alternate implementation, the present system and method logs the purchases made by a user for a provided palette of colors. When it is determined, from the logs, that the palette of colors relate to children's colors and a purchase has been made, the palette of colors corresponding to the purchase may form the basis for sponsored colors to future users who provide an image of a children's area (e.g., determined as a nursery in the room type analysis) in request for relevant products.

In yet another aspect, the system and processes described with respect to FIGS. 1-12 are also applicable to capture colors in a virtual environment, such as a gaming environment. For example, when a user wishes to determine the colors in a frame of a game and to use relevant colors virtually or in the physical environment, the user may present the frame as an image forming the basis for a color search. A palette of colors is obtained based on the colors in the video game frame and may represent colors for products that exist as to the scene described in the video game frame. Alternatively, a user may be recommended virtual products, including device wall papers, photo editing applications, devices, images, and other procurable items in response to a search based on colors in a video game frame.

Figure 10:
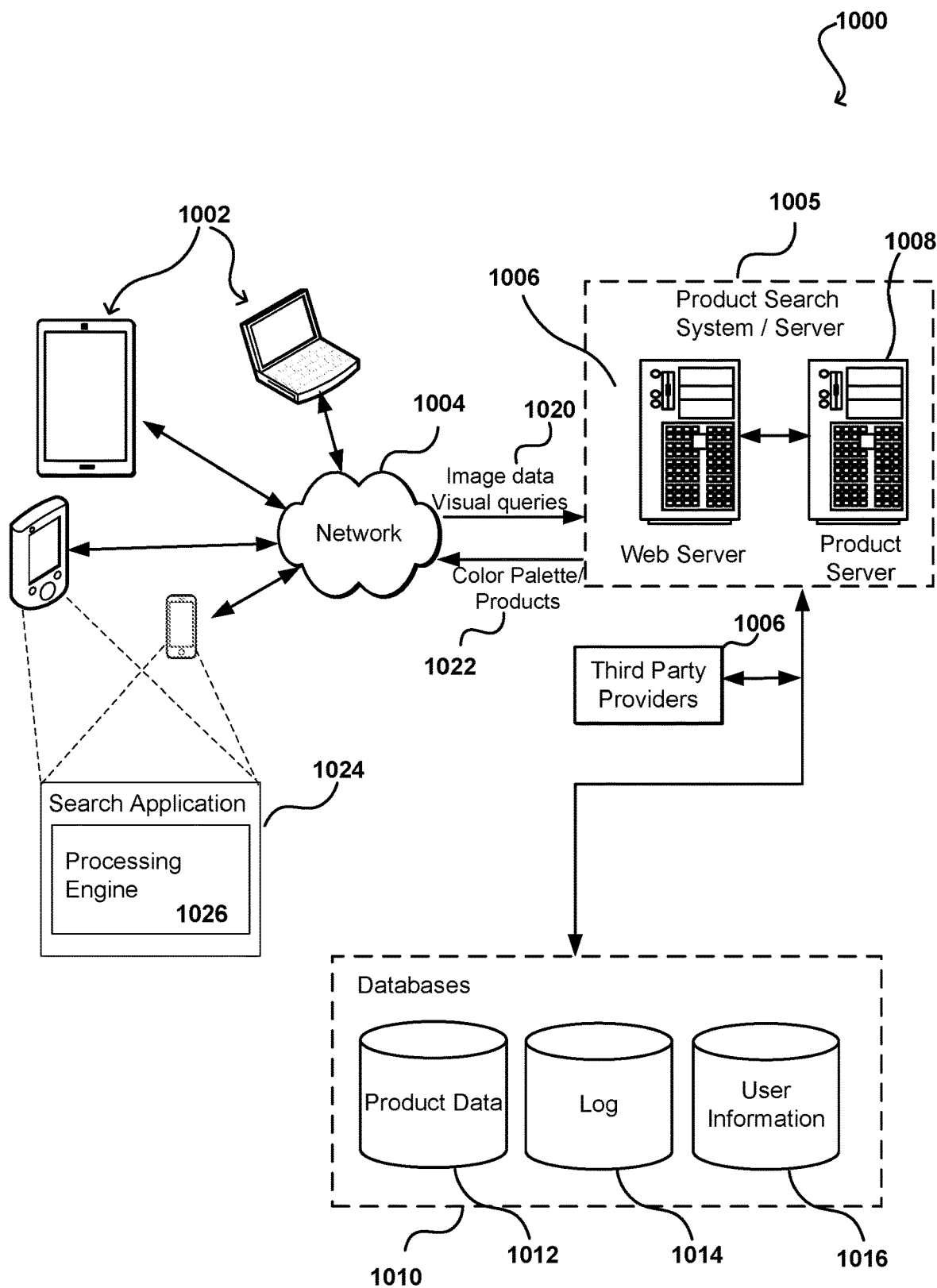
FIG. 10 illustrates an example architecture of a system for capturing color information from a physical environment and providing related products in accordance with various embodiments.

FIG. 10 illustrates an example system 1000 for capturing color information from a physical environment and providing related products. As will be appreciated, although a web-based environment is used for purposes of explanation, different environments may be used, as appropriate, to implement various embodiments. The system 1000 includes computing devices 1002, which can include any appropriate device operable capture images and/or to communicate images and product information over an appropriate network 1004. Examples of such computing devices 1002 include those described with respect to FIGS. 1B, 2, 3, 4B, 9 and 10, and can further include personal computers, tablets, ultrabooks, smartphones, cell phones, wearable watches and related devices, handheld messaging devices, laptop computers, set-top boxes, personal data assistants, electronic book readers and the like. Further, the computing device 1002 may include a search application 1024 for capturing images or the live camera view, for providing the palette of colors corresponding to the colors in the captured images or the live camera view, and for communicating with the user and the product search system/server 1005. The search application may include a processing engine 1026 for performing one or more image processing functions, such as to train an NN to recognize color information from the image data discussed with respect to FIG. 2. The network 1004 can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network 1004 can be enabled via wired or wireless connections and combinations thereof. In this example, the network includes the Internet, as the environment includes a web server 1006 for receiving requests and serving content in response thereto, although for other networks, an alternative device serving a similar purpose could be used, as would be apparent to one of ordinary skill in the art.

The illustrative system 1000 includes at least one application (or product) server 1008 and a data store or databases 1010. It should be understood that there can be several application servers, layers or other elements, processes or components, which may be chained or otherwise configured, which can interact to perform tasks such as obtaining data from an appropriate data store. Further, the web server 1006 and the application (or product) server 1008 are part of a product search system/sever 1005, similar to description with regards to FIGS. 2 and 3. As used herein, data store or database refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling the image data and/or visual queries 1020 for an application of the computing device 1002. In response a color palette or products 1022 are provided from the product search system/server 1005. The application server 1008 provides access control services in cooperation with the data store and is able to generate content such as text, graphics, audio and/or video to be transferred to the user, which may be served to the user by the Web server 1006 in the form of hypertext markup language (HTML), extensible markup language (XML), or another appropriate structured language in this example. The handling of all requests and responses, as well as the delivery of content between the client device 1002 and the application server 1008, can be handled by the web server 1006. It should be understood that the web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store 1010, as illustrated, includes mechanisms for storing content (e.g., product data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a web page that the user is able to view via a browser on the computing device 1002. Information for a particular product can be viewed in a dedicated page or window of the browser after overlaying in the image, for instance. In such an implementation the overlay include hyperlink, clickable, or selectable aspects to allow the product information to open in a same application as the image or a separate application, such as a browser, of the computing device 1002.

Each server 1006-1008 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

In some embodiments, the web server 1006, product server 1008, and similar components, can be considered to be part of a product search system 1005 and, broadly, of a data plane 1010. The handling of all requests and responses, as well as the delivery of content between the computing devices 1002 and the product server 1008, can be handled by the web server 1006. The web server 1006 and product server 1008 are merely example components. However, more or fewer components can be used as structured code can be executed on any appropriate device or host machine as discussed elsewhere herein.

The data plane 1010 includes one or more resources, servers, hosts, instances, routers, switches, databases, other similar components, or a combination thereof. The resources of the data plane 1010 are not limited to storing and providing access to data. Indeed, there may be several product servers, layers, or other elements, processes, or components, which may be chained or otherwise configured, and which can interact to perform tasks including, for example, obtaining data from an appropriate database. As used in this specification, database also refers to any device or combination of devices capable of storing, accessing, and retrieving data, which may include any combination and number of data servers, databases, data storage devices, and data storage media, in any standard, distributed, or clustered environment.

The databases of the data plane 1010 can include several separate data tables, databases, or other data storage mechanisms and media for storing data relating to a particular aspect. For example, the data plane 1010 illustrated includes mechanisms for storing product data 1012 and user information 1016, which can be used to serve content. The data plane 1010 is also shown to include a mechanism for storing log data 1014, which can be used for purposes such as reporting and analysis. The data plane 1010 is operable, through logic associated therewith, to receive instructions from the product server 1008 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

In another example implementation of the present disclosure, a palette of colors presented from a live camera view, an image, or video of a physical environment, on a device, may be used to customize software features of an operating system of the device. The software features may include software buttons, icons, fonts, backgrounds, screensavers, screen borders, screen windows, notifications, highlights, and other related features. As a result, if a user of the device wants to personalize icon colors to colors in a physical environment, the user may use the device to first capture a representation of the physical environment using the camera of the device. When a garden is used in an example of the physical environment, the live camera view on a display of the device provides a palette of colors representing the colors in the garden, including colors of trees, leaves, and general flora. On selecting a color of the palette of colors—e.g., green—the user may be presented an option to change the software features in the user's device to the color selected. Alternatively, the user is provided an option to procure icons in an icon package from a software application store, where the icons include one or more selected color from the palette of colors. This example extends to changing the background color or purchasing backgrounds including the color, or for changing font colors. In another example, pointing a camera at magazines or photos of celebrities allows a user to secure a palette of colors corresponding to colors represented in the live camera view. The color of an eye, captured in such a manner, will result in a palette of colors including the eye color, which may then be used to change or procure colors for software features of the device incorporating the camera.

Figure 11:
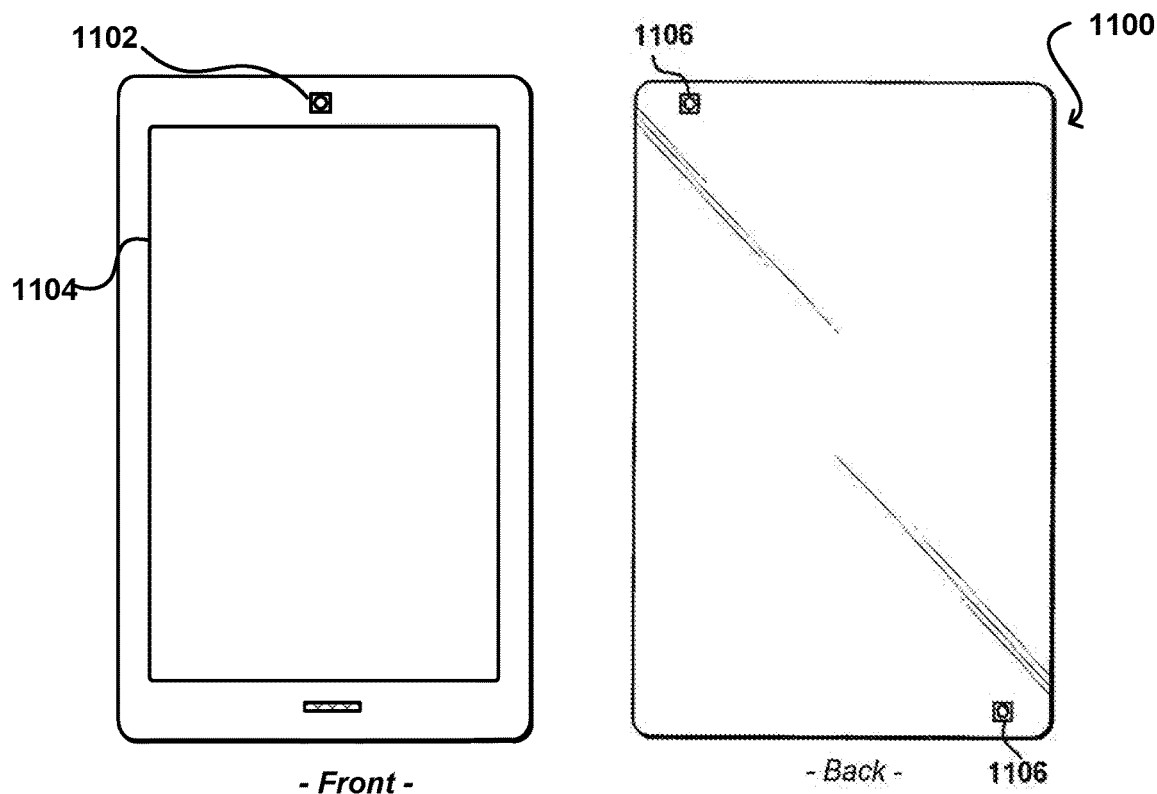
FIG. 11 illustrates an example computing device for performing one or more of the disclosed embodiments in accordance with various embodiments.

FIG. 11 illustrates an example of a computing device 1100 (in the front and back views) that is available for use in accordance with various embodiments. Such a computing device 1100 is similar to those described with respect to FIGS. 1B, 2, 3, 4B, 10, and 12. Screen 1104 is provided to display the various UIs in the various embodiments above. Computing device 1100 includes a front facing camera 1102 for interfacing with the UIs, but also, and preferably, includes one or more back facing cameras (e.g., reference numerals 1106) that interfaces with the UI for performing the various embodiments herein.

Figure 12:
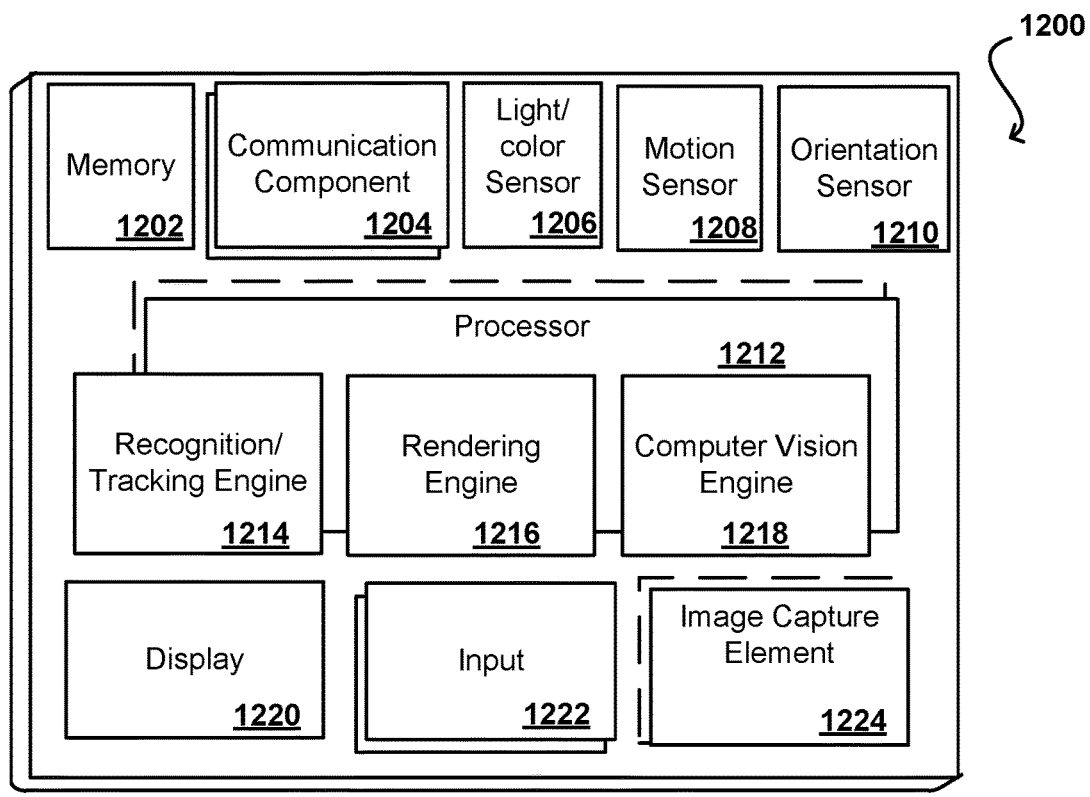
FIG. 12 illustrates example components of the computing device of FIG. 11 in accordance with various embodiments.

FIG. 12 illustrates an example configuration of components 1202-1224 of an example computing device 1200, such as computing device 1100 illustrated in FIG. 9, or the computing devices generally disclosed throughout this disclosure. Components 1202-1224 are a set of basic components for a computing device, but alternative or different arrangements are applicable for any of the disclosed computing devices in this disclosure, without changing the features in the embodiments above. In the example of FIG. 12, the computing device 1200 includes at least one processor 1212 for executing instructions that can be stored in a memory device or element 1202. As would be apparent to one of ordinary skill in the art, upon reading this disclosure, that the computing device 1200 can include many types of memory, data storage or computer-readable media, such as a data storage for program instructions for execution by the processor 1212. The same or separate storage can be used for images or data, and a removable memory can be available for sharing information with other devices. Further, any number of communication approaches can be available for sharing the information with other devices. Furthermore, it would also be apparent to one of ordinary skill, upon reading this disclosure, that processor 1212 may be multiple processors, each with processing tasks for the embodiments here, and may collectively act as a processor for the embodiments herein.

The computing device 1200 includes at least one type of screen or display element 1220, such as a touch screen, electronic ink (e-ink), organic light emitting diode (OLED) or liquid crystal display (LCD), although devices such as portable media players might convey information via other means, such as through audio speakers. The computing device 1200, in an example, also includes at least two image capture elements (illustrated as a single block 1224, with underlying blocks for more image capture elements, marked in broken lines). In an example, at least one image capture element 1224 is positioned to determine a relative position of objects in its frame of view. For example, the image capture element 1224 is operable to image or capture image data from a user, people, or other viewable objects in the vicinity of the computing device 1200. As previously noted, the image capture element 1224 can include any appropriate technology, such as a CCD or CMOS image capture element having a sufficient resolution, focal range and viewable area, to capture an image of objects and ambient lighting as part of operating the computing device 1200. Methods for capturing images or video using an image capture element with a computing device are known in the art, upon reading this disclosure. Further, it is generally understood, from this disclosure, that image capture can be performed using a single image, multiple images, periodic imaging, continuous image capturing, image streaming, video, live camera view, etc. As discussed, IR imaging can also be used to locate and track features of a user.

A computing device, e.g., the computing device 1200, has at least two sensors or image capture elements (e.g., reference numerals 1224) with each capable of capturing image data with color information from the multiple sensors 1224. Additionally position information also provided via the sensors 1224, and is used to determine a three dimensional (3D) position of image or objects in a physical environment for the computing device 1200. Such a process uses a distance, as well as a relative projection direction, of light sources from the objects and the ambient environment for making such a determination of the relative position of the light source. Such an approach enables an accurate capture of color information.

Further, although the above-described light sources are along a plane for an object, it should be understood that the light paths can form a 2D array that is available from which to capture color for a semi-hemispherical range of angles and from which to direct the light reflected from objects to a 2D array of pixels (e.g., for a VGA chip) or other such configuration of the sensor 1206 or 1224. With an approach similar to that discussed throughout this disclosure, a computing device 1200 can determine the color information for each light exposed to the camera sensor, and can use that information to develop a histogram of colors for the image or live camera view. In at least an example embodiment, there are more than one sensor/light elements positioned about the computing device 1200 in order to capture color information from substantially any direction around the computing device 1200. When the light is received with sufficient angular range, the computing device 1200 can have two arrays on opposing sides and develop a reasonable lighting model to accurately describe the colors in the physical environment. The light from the physical environment is only recognized at substantially a thickness of the casing of the computing device 1000, and thus, is primarily the size of the sensor 1206, 1218 (and any electronic paths or connectors) is added to the interior of the computing device 1200.

The computing device 1200 additionally includes at least one orientation sensor 1210, such as an accelerometer, digital compass, electronic gyroscope or inertial sensor, which can assist in determining movement or other changes in orientation of the device. The device can include at least one additional input device 1222 that is available to receive conventional input from a user. This conventional input can include, for example, radio-communications type wand devices, hand or gesture sensors, a push button, touch pad, touch screen, wheel, joystick, keyboard, mouse, trackball, keypad or any other such device or element whereby a user can input a command to the device. The conventional input, in one example, interfaces with the UI to move pointers or indicators on the UI, as in the case of the finger or stylus discussed with reference to FIG. 4A. One more of the additional input device 1222, in an example, is connected to the computing device 1200 by a wireless IR or Bluetooth® or other link. In an embodiment, computing device 1200 might not include any buttons at all and might be controlled only through a combination of visual and audio commands such that a user can control the computing device without having to be in contact with the computing device.

Furthermore, the computing device 1200 includes, in another example, communication component 1204 representing various communication features for the computing device to commute with near and far devices. For example, using Bluetooth®, Wi-Fi®, and other communication protocols. A light/color sensor 1206 and a motion sensor 1208 are provided to enable the computing device to be used in various lighting environments and to enable the computing device UI to be controller by movement gestures as discussed with respect to FIG. 4A, for instance. A recognition and tracking engine 1214 is provided to track a user and vary the lighting effects from an added light source to the screen view when the computing device is moved. A rendering engine 1216 is provided to render image data as discussed with respect to above embodiments, when it is required to provide color or scene information from the computing device 1200.

In an example, the computing device 1200 uses the light/color sensor 1206 to determine whether the device is exposed to ambient light or is in relative or complete darkness. Such a light sensor 1206 is beneficial in a number of ways to provide an accurate color representation for a physical environment, but also to accurately capture color, lighting, and shadowing conditions in a live camera view, an image, or a video captured by a camera 1224. For example, the light/color sensor 1206 is applicable to determine when a color is captured required post-capture processing to provide better shading, brightness, hue, or other aspects, than is presently in an image capture frame.

In an implementation, any pair of cameras 1106 (in FIG. 11) that have at least a partially overlapping field of view, is used to provide 3D imaging by capturing image data for one or more objects from two different perspectives or points of view, and combining the information to produce a 3D image.

Such processes are useful in the above embodiments, where the deeper color information is desired for different angles than a 2D view point. Example approaches include calculating an amount of disparity through a process such as edge matching, feature location and matching, color matching, and/or texture matching, and combining the disparity information with color information from each perspective to generate a three-dimensional image, either before or at a time of display. For example, if the image data is matched then the image data can be combined and/or displayed directly on a 3D-capable display, where the human brain can effectively do at least some of the 3D processing. In other examples, the image data can be otherwise combined or processed at the time of display such that upon displaying the image data, a 3D image is generated. A person of ordinary skill would recognize, with the present disclosure, that 3D image data can be used for other purposes or for further processing, such that using the image data to generate and display a 3D image is not required. For example, the image data can be used to determine shape and/or relative position information for various computer vision techniques, such as for determining one or more viewpoint and scale invariant feature information used for object recognition and/or tracking. For the computer vision techniques above, a computer vision engine of processor 1212 is applicable to decrease the burden on the processor 1212 by executing specific algorithms as detailed above.

In a further example implementation, motion sensor 1206 is configured to provide motion input to the UI using a user's face (e.g., eyes) to determine various aspects useful for determining relative orientation. The front camera includes, in an example, the features for the motion sensor 1206 to track a user's eye. Once the user's eye is tracked, an algorithm is processed to place a virtual box around an object of the representations of the objects in the screen view. The position and/or size of this box is continually updated and monitored in order to monitor relative user position. Similar algorithms can also be used to determine an approximate location and area of each of the user's eyes (or in some cases the eyes in tandem). In determining the location of the user's eyes, the processor 1212 can determine the view position of the user's head, and can determine that the user is facing the device. Further, the relative movement of the user's eyes can be easier to detect than the overall movement of the user's head when performing motions such as nodding or shaking the head back and forth. Monitoring the virtual box size also helps to provide distance information as well as directional information, which can be helpful when generating a 3D version of the captured image, live camera view, or video.

Once the positions of facial features of a user are identified, relative motion between the user and the device can be detected and utilized as input. For example, the UI of the above embodiments interfaces with the computing device and the movement of the user's head in an up and down movement, with respect to the viewable area of the image capture element, e.g., front facing camera 1202. As discussed, this could be the result of the user moving his or her head, side to side, or the user moving the device up and down (and further, side to side). Each of these movements are tracked, in an example, as a vertical or horizontal movement, respectively, and each can be treated differently as an input to provide a realistic view point for the live camera view, image, or video. As should be understood, such a process also can detect diagonal or other such movements.

Further, the computing device, with the present disclosure, can also distinguish between different users using the eye information, at least.

As mentioned, various embodiments include tracking of one or more objects of interest in three-dimensional space. With the third dimension image data, i.e., depth, distance, or disparity, from at least a pair of 2D images, object tracking can be less sensitive to factors such as shadows, lighting changes, and camera dynamics. Depth, disparity, or distance information can also optimize object tracking. As the relative sizes of an object's features are known, the computational expense of searching over scales can be minimized and the probability of false detections may be reduced since the search space is decreased. Depth, distance, or disparity, in an example, is applied to obtain shape and size information that can help to differentiate among foreground objects for improved tracking. Further, the previously described occlusions is more easily detected and handled more explicitly when more 3D information is available. Depth, distance, or disparity also provides at least another disambiguating dimension that can help to improved tracking.

In some embodiments, determining, for a pixel, the closest color among the fine color representative is performed in a color space other than RGB space or HSV space. For example, Lab color space (CIELAB), which incorporates a dimension L for lightness and 'a' and 'b' for color-opponent dimensions could also be used for assigning pixels in an image to the fine color representatives. As used herein, a color opponent is associated with a process in color theory that suggests that color perception is controlled by the activity of two opponent systems: a blue-yellow mechanism and a red-green mechanism. Thus, the HSV space and Lab color space can be used for different purposes. For example, the HSV space can be used to determine the fine colors representatives and the Lab color space can be used to compute distances when comparing the color content of two images.

For example, for an image of a multi-colored shoe that includes equal parts of the color white and the color pink, the color information for the image can describe a histogram that generally represents equal parts of the colors white and pink. A comparison of the color information against a sample image for the color pink will typically generate a high visual similarity score. In addition, a comparison of the color information against a sample image for the color white will also generate a high visual similarity score. Thus, the colors white and pink can be selected as colors that are visually similar to the colors in the image of the multi-colored shoe.

Methods for capturing images or video using a camera element with a computing device are well known in the art and will not be discussed herein in detail. It is readily apparent, on reading the present disclosure, that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

As an example, a computing device can capture and/or track information for a user over a period of time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of databases and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
a processor;
a screen;
a camera; and
memory including instructions that, when executed by the processor, cause the system to:
receive image data of a live camera view from the camera, the image data including a representation of a physical environment;
analyze the image data using a first trained neural network comprising first layers of first nodes to determine color information describing a plurality of colors represented in the physical environment;
analyze the image data using a second trained neural network comprising second layers of second nodes to determine scene information describing a room type associated with the physical environment;
generate a palette of colors that includes at least a portion of the plurality of colors;
receive a selection of a color from the palette of colors; and
overlay a product in the live camera view to provide an augmented reality view of the physical environment, the product associated with the color and the room type.

2. The system of claim 1, wherein the instructions when executed by the processor further enable the system to:
provide one or more of:
a selectable option to procure the product;
information associated with the product;
advertisement associated with the product; and
location information associated with stores that provide the product.

3. The system of claim 2, wherein the instructions when executed by the processor further enable the system to:
receive an input for adjusting a zoom for a portion of the live camera view;
update the image data to the portion of the live camera view, the update to the image data including the color information with a degree of separation in the plurality of colors higher than the image data obtained without the zoom; and
update the palette of colors in response to the zoom.

4. The system of claim 1, wherein the instructions when executed by the processor further enable the system to:
compare a first color of the plurality of colors with a stored color from a database to determine a visual similarity score between the first color and the stored color;
determine that the visual similarity score satisfies a threshold score; and
provide the stored color as part of the palette of colors.

5. The system of claim 1, wherein the instructions when executed by the processor further enable the system to:
generate a color temperature slider that is configured to adjust a respective temperature of colors in the palette of colors;
receive an adjust of the color temperature slider;
adjust the respective temperature of colors to generate updated respective color temperatures, wherein the updated respective color temperatures are associated with an updated product listing.

6. A computer-implemented method comprising:
capturing image data that includes a representation of a physical environment from a sensor;
determining color information from the image data using a first neural network comprising first layers of nodes, the color information describing colors in the physical environment according to the sensor;
determining scene information from the image data using a second neural network comprising second layers of nodes, the scene information describing a room type associated with the physical environment;
displaying a palette of colors responsive to the image data, the palette of colors including at least a portion of the colors; and
upon selection of a color from the palette of colors, displaying the image data and an item listing, items in the item listing associated with the color selected from the palette of colors and associated with the room type.

7. The computer-implemented method of claim 6, further comprising:
sending the color information to a server;
providing, on a display screen of a computing device, the palette of colors as an overlay over the image data, the image data further comprising a live camera view; and
displaying the items in the item listing.

8. The computer-implemented method of claim 6, further comprising:
providing a live camera view from the image data;
receiving a selection of an item from the item listing; and
overlaying the item over an area of the live camera view.

9. The computer-implemented method of claim 6, further comprising:
providing a live camera view from the image data;
receiving a selection of a portion of the live camera view; and
providing the color information as describing colors for the selection of the portion of the live camera view.

10. The computer-implemented method of claim 9, further comprising:
receiving a selection of a lighting model to identify a selected lighting model, the selected lighting model calibrated to lighting conditions existing at a time the image data is captured;
adjusting, based at least in part on the selected lighting model, color settings of the colors; and
updating the item listing to reflect adjustments to the color settings of the colors.

11. The computer-implemented method of claim 6, wherein the item listing is provided in accordance with a popularity measure for either the color or items in the item listing.

12. The computer-implemented method of claim 6, wherein a color in the palette of colors corresponds to a sponsored color, provided by a curator or an item sponsor, for inclusion in the palette of colors, the sponsor colors being complementary or contrasting colors to the color from the selection of the colors.

13. The computer-implemented method of claim 6, wherein a color in the palette of colors or an item in the item listing corresponds to one of a particular brand of product preferred by a user, a complementary color to the color from the selection of the colors, or a contrasting color to the color from the selection of the colors.

14. The computer-implemented method of claim 6, further comprising:
generating visual similarity scores between the color information and stored color information for colors in a database of color samples;
comparing the visual similarity scores against a threshold; and identifying, based at least in part on the comparing of the visual similarity scores against the threshold, color samples for inclusion in the palette of colors.

15. The computer-implemented method of claim 14, wherein generating the visual similarity scores further comprises:
associating first color values to the color samples in the database of color samples;
associating second color values to pixels providing the image data from the physical environment, the second color values forming the color information; and
comparing each of the second color values to each of the first color values to provide the visual similarity scores.

16. The computer-implemented method of claim 6, further comprising:
determining that a first color value of the color information (a) satisfies a threshold value and (b) is associated with a first item of the item listing;
determining that a second color value of the color information (c) satisfies the threshold value and (d) is associated with a second item of the item listing;
providing a first color and a second color associated with the first color value and the second color value respectively, as part of the palette of colors; and
ordering the first color of the second color in a presentation order for the palette of colors.

17. A non-transitory computer-readable storage medium including instructions that, when executed by at least one processor, cause the at least one processor to:
capture, using a camera of a computing device, data that includes colors from a physical environment;
determine color information from the data to describe the colors using a first neural network comprising first layers of nodes;
determine scene information from the data, using a second neural network comprising second layers of nodes, to describe a room type associated with the physical environment;
display a palette of colors responsive to the data, the palette of colors including at least a portion of the colors; and
upon selection of a color from the palette of colors, displaying the data and one or more items, the one or more items associated with the color and associated with the room type.

18. The non-transitory computer-readable storage medium of claim 17, wherein the instructions when executed further cause the at least one processor to:
send the color information to a server;
provide, on a display screen of the computing device, the palette of colors as an overlay over the data, the data further comprising a live camera view; and
responsive to sending the color information to the server, receive from the server to the computing device, the one or more items.

19. The non-transitory computer-readable storage medium of claim 17, wherein the instructions when executed further cause the at least one processor to:
provide an augmented reality view of a live camera view comprised in the data, the augmented reality view comprising the one or more items overlaid over the live camera view.

20. The non-transitory computer-readable storage medium of claim 19, wherein the instructions when executed further cause the at least one processor to:
save the live camera view as an original version and the augmented reality view as an augmented version; and
display the original version and the augmented version, either concurrently or separately.

21. The non-transitory computer-readable storage medium of claim 17, wherein the one or more items are software features of an operating system of the computing device and the selection of the color causes the software features to be displayed in the color.

* * * * *